(12) United States Patent
Zhang

(10) Patent No.: US 12,301,664 B2
(45) Date of Patent: May 13, 2025

(54) IoT DEVICE DATA MANAGEMENT METHOD, APPARATUS, AND SYSTEM

(71) Applicant: Huawei Cloud Computing Technologies Co., Ltd., Guizhou (CN)

(72) Inventor: Tongfei Zhang, Shenzhen (CN)

(73) Assignee: HUAWEI CLOUD COMPUTING TECHNOLOGIES CO., LTD., Guizhou (CN)

( * ) Notice: Subject to any disclaimer, the term of this patent is extended or adjusted under 35 U.S.C. 154(b) by 0 days.

(21) Appl. No.: 17/682,164

(22) Filed: Feb. 28, 2022

(65) Prior Publication Data

US 2022/0191279 A1 Jun. 16, 2022

Related U.S. Application Data

(63) Continuation of application No. PCT/CN2020/111471, filed on Aug. 26, 2020.

(30) Foreign Application Priority Data

Aug. 29, 2019 (CN) .......................... 201910810547.0

(51) Int. Cl.
*H04W 4/60* (2018.01)
*G16Y 20/20* (2020.01)
(Continued)

(52) U.S. Cl.
CPC .............. *H04L 67/12* (2013.01); *G16Y 20/20* (2020.01); *G16Y 40/35* (2020.01); *H04W 4/60* (2018.02)

(58) Field of Classification Search
CPC ........ G16Y 20/20; G16Y 40/35; H04L 67/12; H04W 4/60; H04W 8/205; H04W 8/24; H04W 12/065; H04W 12/72; H04W 4/70
See application file for complete search history.

(56) References Cited

U.S. PATENT DOCUMENTS 8,798,581 B2    8/2014  Fang
10,743,181 B1*  8/2020  Selvaraj ................ H04W 12/45
(Continued)

FOREIGN PATENT DOCUMENTS

CN        1761349 A     4/2006
CN        1867147 A    11/2006
(Continued)

OTHER PUBLICATIONS

3GPP TR 33.868 V12.1.0, Jun. 2014, "3rd Generation Partnership Project; Technical Specification Group Services and System Aspects; Study on security aspects of Machine-Type Communications(MTC) and other mobile data applications communications enhancements (Release 12)," 116 Pages.
(Continued)

*Primary Examiner* — Jason D Recek
(74) *Attorney, Agent, or Firm* — Conley Rose, P.C.

(57) ABSTRACT

In an IoT device data management method, an IoT device sends a data report message to a device management server, to report a device identifier of the IoT device and a SIM card identifier of a SIM card in the IoT device. The device management server stores the device identifier and the SIM card identifier, and may further synchronize the device identifier and the SIM card identifier to a connectivity management server. In this way, the device management server establishes and maintains a correspondence between the device identifier of the IoT device and the SIM card identifier.

20 Claims, 6 Drawing Sheets

(51) Int. Cl.
*G16Y 40/35* (2020.01)
*H04L 67/12* (2022.01)

(56) References Cited

U.S. PATENT DOCUMENTS

| | | | |
|---|---|---|---|
| 2008/0102816 A1 | 5/2008 | Shan et al. | |
| 2008/0132205 A1 | 6/2008 | Svensson | |
| 2014/0302816 A1* | 10/2014 | Yu | H04W 12/48 |
| | | | 455/410 |
| 2015/0099562 A1* | 4/2015 | Xiong | H04W 12/04 |
| | | | 455/558 |
| 2015/0350411 A1* | 12/2015 | Blom | H04W 12/126 |
| | | | 455/411 |
| 2016/0182110 A1 | 6/2016 | Selvaraj et al. | |
| 2016/0366708 A1 | 12/2016 | Yeom et al. | |
| 2017/0188226 A1 | 6/2017 | Wu | |
| 2017/0245139 A1* | 8/2017 | Wu | H04W 8/22 |
| 2018/0077012 A1* | 3/2018 | Tellado | G06F 21/33 |
| 2019/0053040 A1* | 2/2019 | Long | H04W 12/06 |
| 2019/0173684 A1 | 6/2019 | Ocher et al. | |
| 2020/0021963 A1 | 1/2020 | Li | |
| 2020/0045546 A1 | 2/2020 | Zhou | |
| 2020/0059976 A1* | 2/2020 | Bhatia | H04W 8/005 |
| 2020/0107185 A1* | 4/2020 | Madej | H04W 8/12 |
| 2020/0177678 A1* | 6/2020 | Livanos | H04L 41/0895 |
| 2020/0267533 A1* | 8/2020 | Zhang | H04W 68/005 |

FOREIGN PATENT DOCUMENTS

| | | | | |
|---|---|---|---|---|
| CN | 1867153 A | 11/2006 | | |
| CN | 101330677 A | 12/2008 | | |
| CN | 102749893 A | 10/2012 | | |
| CN | 104202400 A | 12/2014 | | |
| CN | 104244227 A | 12/2014 | | |
| CN | 105228125 A | 1/2016 | | |
| CN | 106021313 A | 10/2016 | | |
| CN | 108293181 A | 7/2018 | | |
| CN | 109587228 A | 4/2019 | | |
| CN | 109962935 A | 7/2019 | | |
| CN | 108293181 B | 2/2021 | | |
| EP | 2750424 A1 | 7/2014 | | |
| EP | 3651040 A1 * | 5/2020 | | G06F 21/30 |
| IN | 109030745 A | 12/2018 | | |
| WO | 2011060709 A1 | 5/2011 | | |
| WO | 2011113355 A1 | 9/2011 | | |
| WO | 2019028269 A2 | 2/2019 | | |
| WO | 2019085803 A1 | 5/2019 | | |

OTHER PUBLICATIONS

Azadeh Zamanifar et al., "DMP-IOT: A distributed movement prediction scheme for IOT health-care applications", Computers and Electrical Engineering 58, Sep. 14, 2016, 17 pages.

Huang Wei et al., "Design of Mine Personnel Positioning System Based on RFID Technology Author," Control Engineering of China, vol. 20, No. 6, with an English abstract, Nov. 2013, 4 pages.

Yan Chaohui, "Research on the Internet of Things Monitoring and Management Platform for Coal Mine Electromechanical Equipment," Taiyuan University of Technology, with an English machine translation, 2016, 2 pages.

* cited by examiner

IoT DEVICE DATA MANAGEMENT METHOD, APPARATUS, AND SYSTEM

CROSS-REFERENCE TO RELATED APPLICATIONS

This is a continuation of Int'l Patent App. No. PCT/CN2020/111471, filed on Aug. 26, 2020, which claims priority to Chinese Patent App. No. 201910810547.0, filed on Aug. 29, 2019, both of which are incorporated by reference.

FIELD

This disclosure relates to the internet of things (IoT) communications technologies, and in particular, to an IoT device data management method, an apparatus, and a system.

BACKGROUND

As there are various services and applications provided by the IoT, such as internet of vehicles, smart home, smart healthcare, and remote meter reading, an IoT management platform needs to provide a management service function for a large quantity of IoT devices. The IoT management platform mainly includes two basic platforms: a device management server, which may also be referred to as a device management platform (DMP) server, and a connectivity management server, which may also be referred to as a connectivity management platform (CMP) server.

The device management server provides device management, such as device status monitoring and command delivery, and the connectivity management server provides subscriber identity module (SIM) card connectivity management, such as SIM card allocation, traffic query, and connection diagnosis. In other words, the device management server is mainly responsible for device management, and the connectivity management server is mainly responsible for SIM card management. Separately managing SIM card information and device information brings difficulties to collaboration between the connectivity management server and the device management server.

SUMMARY

Embodiments provide an IoT device data management method, an apparatus, and a system, to establish a correspondence between a device and a SIM card, and facilitate mutual cooperation between a connectivity management server and a device management server.

According to a first aspect, an embodiment provides an IoT device data management method, including: A device management server receives a data report message sent by a first IoT device, where the data report message carries a device identifier of the first IoT device and a first SIM card identifier, and the first SIM card identifier is an identifier of a SIM card in the first IoT device. The device management server stores, based on the received data report message, the device identifier and the first SIM card identifier corresponding to the device identifier.

In this way, the device management server may establish and maintain a correspondence between a device identifier of an IoT device and a SIM card in the IoT device. When the device management server and a connectivity management server need to be cooperatively used, the device management server may query the correspondence to invoke the connectivity management server. This facilitates mutual cooperation between the device management server and the connectivity management server. In addition, the IoT device reports the device identifier and the SIM card identifier. This improves data collection and management efficiency, and ensures data accuracy.

In a possible design, before the device management server receives the data report message sent by the first IoT device, the device management server establishes a connection to the first IoT device, to form a data report channel.

In a possible design, the device management server may further send a data synchronization message to the connectivity management server. The data synchronization message carries the device identifier of the first IoT device and the first SIM card identifier. In this way, the connectivity management server 103 may also establish and maintain the correspondence between the device identifier of the IoT device and the SIM card in the IoT device. The connectivity management server may query the correspondence to invoke the device management server. For example, when the connectivity management server requires IoT device information, the connectivity management server may query the correspondence based on the device identifier of the IoT device to determine a corresponding SIM card identifier, and then request the required IoT device information from the device management server based on the SIM card identifier. Therefore, cooperation between the device management server and the connectivity management server is more efficient.

In a possible design, the data report message is a Message Queuing Telemetry Transport (MQTT) message or a Constrained Application Protocol (CoAP) message. The data synchronization message may also be an MQTT message or a CoAP message.

In a possible design, before the device management server stores the device identifier of the first IoT device and the first SIM card identifier, the device management server may further query a stored device identifier of an IoT device based on the device identifier of the first IoT device. If a SIM card identifier corresponding to the device identifier of the first IoT device has not been stored, the device management server stores the device identifier of the first IoT device and the corresponding first SIM card identifier. If a second SIM card identifier corresponding to the device identifier of the first IoT device has been stored, the device management server updates the second SIM card identifier to the first SIM card identifier.

In this way, the device management server may store the device identifier of the IoT device and the corresponding SIM card identifier that are reported for the first time, and may further update the stored SIM card identifier in time after a SIM card in the IoT device is replaced, to ensure data accuracy.

In a possible design, if the second SIM card identifier is different from the first SIM card identifier, the device management server further determines that device-card binding has been set for the first IoT device, and sends a first message to a client device, where the first message is used to notify the client device that device-card binding has been set for the first IoT device.

Therefore, the device management server determines, based on a device-card binding status of the IoT device, whether to update the SIM card identifier of the IoT device. When device-card binding has been set for the IoT device, the IoT device sends the first message to the client, to prompt a user, so that the user learns of a status of the IoT device in time. If the SIM card is replaced illegally, the user performs further processing to solve a security risk. If the SIM card is replaced by the user, the user performs device-card unbinding on the IoT device, and further normally uses a new SIM card. This improves user experience.

In a possible design, the device management server stores and maintains a device-card binding status of the IoT device; and that the device management server determines that device-card binding has been set for the first IoT device includes: The device management server determines, based on the device identifier of the first IoT device and stored device-card binding statuses of a plurality of IoT devices, that the device-card binding status of the first IoT device is that device-card binding has been set.

In a possible design, after the device management server determines that device-card binding has been set for the first IoT device, the device management server further sets a status of the first IoT device to an abnormal status, to avoid a security risk.

In a possible design, after the device management server determines that device-card binding has been set for the first IoT device, the device management server further sends a second message to the connectivity management server, where the second message is used to notify the connectivity management server to disable a SIM card corresponding to the first SIM card identifier and/or a SIM card corresponding to the second SIM card identifier. When device-card binding has been set for the first IoT device, there is a security risk if the SIM card in the first IoT device is replaced. In this case, the device management server notifies the connectivity management server to disable a related SIM card, to avoid a security problem and improve security.

In a possible design, the device management server receives a third message sent by the client device, where the third message is used to notify the device management server that device-card unbinding is performed on the first IoT device; and the device management server updates the second SIM card identifier to the first SIM card identifier based on the third message.

After determining that device-card binding has been set for the first IoT device, the device management server may cache the device identifier and the corresponding first SIM identifier. After receiving a notification, sent by the client device, that device-card unbinding is performed on the first IoT device, the device management server may update the second SIM card identifier to the first SIM card identifier.

In a possible design, the device management server may further update a device-card binding status of the first IoT device based on the third message. Specifically, the device management server updates the device-card binding status of the first IoT device to a state that device-card binding has not been set. In this way, the user may perform a device-card unbinding management operation on the device management server by using the client device, to help the user manage the IoT device, and improve user experience. In addition, the device management server may locally store and maintain the device-card binding status of the IoT device, to perform automatic monitoring. This improves security.

According to a second aspect, an embodiment provides an IoT device data management method, including: An IoT device obtains a device identifier of the IoT device and a first SIM card identifier, where the first SIM card identifier is an identifier of a SIM card in the IoT device. The IoT device sends a data report message to a device management server, where the data report message carries the device identifier of the IoT device and the first SIM card identifier.

The IoT device reports the device identifier and the SIM card identifier. This improves data collection and management efficiency, and ensures data accuracy. In addition, this helps the device management server establish a correspondence between the device identifier of the IoT device and a SIM card in the IoT device, and further facilitates mutual cooperation between the device management server and a connectivity management server.

In a possible design, the data report message is an MQTT message or a CoAP message.

In a possible design, before sending the data report message to the device management server, the IoT device may further establish a connection to the device management server, to form a data report channel.

In a possible design, if the IoT device has stored a second SIM card identifier corresponding to the device identifier, the IoT device may further compare the second SIM card identifier with the first SIM card identifier. If the second SIM card identifier is different from the first SIM card identifier, the IoT device sends the data report message to the device management server. The data report message may further carry an indication of SIM card replacement reporting.

According to a third aspect, an embodiment provides an IoT device data management method, including: A connectivity management server receives a data synchronization message sent by a device management server, where the data synchronization message carries a device identifier of a first IoT device and a first SIM card identifier, and the first SIM card identifier is an identifier of a SIM card in the first IoT device. The connectivity management server stores the device identifier of the first IoT device and the corresponding first SIM card identifier.

In this way, the connectivity management server may establish and maintain a correspondence between a device identifier of an IoT device and a SIM card in the IoT device. When the device management server and the connectivity management server need to be cooperatively used, the connectivity management server may query the correspondence to invoke the device management server. For example, when the connectivity management server requires IoT device information, the connectivity management server may query the correspondence based on the device identifier of the IoT device to determine a corresponding SIM card identifier, and then request the required IoT device information from the device management server based on the SIM card identifier. Therefore, cooperation between the device management server and the connectivity management server is more efficient. In addition, the device management server synchronizes the device identifier and the SIM card identifier. This improves data collection and management efficiency, and ensures data accuracy.

In a possible design, the data synchronization message may be an MQTT message or a CoAP message.

In a possible design, the connectivity management server may further receive a second message sent by the device management server or a client device. The second message is used to notify the connectivity management server to disable a SIM card corresponding to the first SIM card identifier and/or a SIM card corresponding to a second SIM card identifier. The second SIM card identifier is a SIM card identifier that has been stored in the connectivity management server and that corresponds to the IoT device. The connectivity management server disables the SIM card corresponding to the first SIM card identifier and/or the SIM card corresponding to the second SIM card identifier based on the second message. When device-card binding has been set for the first IoT device, there is a security risk if the SIM card in the first IoT device is replaced. In this case, the connectivity management server disables a related SIM card, to avoid a security problem and improve security.

In a possible design, before the connectivity management server stores the device identifier of the first IoT device and the first SIM card identifier, the connectivity management server may further query a stored device identifier of an IoT device based on the device identifier of the first IoT device. If a SIM card identifier corresponding to the device identifier of the first IoT device has not been stored, the connectivity management server stores the device identifier of the first IoT device and the corresponding first SIM card identifier. If the second SIM card identifier corresponding to the device identifier of the first IoT device has been stored, the connectivity management server updates the second SIM card identifier to the first SIM card identifier.

In this way, the connectivity management server may store the device identifier of the IoT device and the corresponding SIM card identifier that are reported for the first time, and may further update the stored SIM card identifier in time after the SIM card in the IoT device is replaced, to ensure data accuracy.

In a possible design, after receiving the data synchronization message sent by the device management server, the connectivity management server may further resume, based on the data synchronization message, the SIM card corresponding to the first SIM card identifier.

When device-card unbinding has been performed on the IoT device 101, replacing the SIM card is a normal operation, and has no security risk. In this case, the connectivity management server 103 should resume the related SIM card, to avoid normal operating of the IoT device.

According to a fourth aspect, an embodiment provides a device management server. The device management server includes a receiving module and a storage module. The receiving module is configured to receive a data report message sent by a first IoT device, where the data report message carries a device identifier of the first IoT device and a first SIM card identifier, and the first SIM card identifier is an identifier of a SIM card in the first IoT device. The storage module is configured to store the device identifier of the first IoT device and the corresponding first SIM card identifier.

In a possible design, the device management server further includes a sending module, and the receiving module and/or the sending module are/is configured to establish a connection to the first IoT device.

In a possible design, the sending module is further configured to send a data synchronization message to a connectivity management server, where the data synchronization message carries the device identifier of the first IoT device and the first SIM card identifier.

In a possible design, the data report message is an MQTT message or a CoAP message. The data synchronization message may also be an MQTT message or a CoAP message.

In a possible design, the device management server further includes a judging module. The judging module is configured to query a stored device identifier of an IoT device based on the device identifier of the first IoT device. If a SIM card identifier corresponding to the device identifier of the first IoT device has not been stored, the storage module is configured to store the device identifier of the first IoT device and the corresponding first SIM card identifier. If a second SIM card identifier corresponding to the device identifier of the first IoT device has been stored, the storage module is configured to update the second SIM card identifier to the first SIM card identifier.

In a possible design, the device management server further includes a determining module. The determining module is configured to: if the second SIM card identifier is different from the first SIM card identifier, determine that device-card binding has been set for the first IoT device. The sending module is further configured to send a first message to a client device, where the first message is used to notify the client device that device-card binding has been set for the first IoT device.

In a possible design, that the determining module is configured to determine that device-card binding has been set for the first IoT device includes: The determining module is configured to determine, based on the device identifier of the first IoT device and stored device-card binding statuses of a plurality of IoT devices, that a device-card binding status of the first IoT device is that device-card binding has been set.

In a possible design, the device management server further includes a processing module, and the processing module is configured to set a status of the first IoT device to an abnormal status.

In a possible design, the sending module is further configured to send a second message to the connectivity management server, where the second message is used to notify the connectivity management server to disable a SIM card corresponding to the first SIM card identifier and/or a SIM card corresponding to the second SIM card identifier.

In a possible design, the receiving module is further configured to receive a third message sent by the client device, where the third message is used to notify the device management server that device-card unbinding is performed on the first IoT device. The storage module is further configured to update the second SIM card identifier to the first SIM card identifier based on the third message.

In a possible design, the storage module is further configured to update a device-card binding status of the first IoT device based on the third message. Specifically, the storage module is further configured to update the device-card binding status of the first IoT device to a state that device-card binding has not been set.

For technical effects brought by any solution in the fourth aspect, refer to the technical effects brought by different solutions in the first aspect. Details are not described herein again.

According to a fifth aspect, an embodiment provides an IoT device. The IoT device includes an obtaining module and a sending module. The obtaining module is configured to obtain a device identifier of the IoT device and a first SIM card identifier, where the first SIM card identifier is an identifier of a SIM card in the IoT device. The sending module is configured to send a data report message to a device management server, where the data report message carries the device identifier of the IoT device and the first SIM card identifier.

In a possible design, the data report message is an MQTT message or a CoAP message.

In a possible design, the IoT device further includes a receiving module, and the sending module and/or the receiving module are/is configured to establish a connection to the device management server.

In a possible design, the IoT device further includes a storage module and a judging module. If the storage module has stored a second SIM card identifier corresponding to the device identifier, the judging module is configured to compare the second SIM card identifier with the first SIM card identifier. If the second SIM card identifier is different from the first SIM card identifier, the sending module is configured to send the data report message to the device management server. The data report message may further carry an indication of SIM card replacement reporting.

For technical effects brought by any solution in the fifth aspect, refer to the technical effects brought by different solutions in the second aspect. Details are not described herein again.

According to a sixth aspect, an embodiment provides a connectivity management server. The connectivity management server includes a receiving module and a storage module. The receiving module is configured to receive a data synchronization message sent by a device management server, where the data synchronization message carries a device identifier of a first IoT device and a first SIM card identifier, and the first SIM card identifier is an identifier of a SIM card in the first IoT device. The storage module is configured to store the device identifier of the first IoT device and the corresponding first SIM card identifier.

In a possible design, the data synchronization message may be an MQTT message or a CoAP message.

In a possible design, the connectivity management server further includes a processing module. The receiving module is further configured to receive a second message sent by the device management server or a client device, where the second message is used to notify the connectivity management server to disable a SIM card corresponding to the first SIM card identifier and/or a SIM card corresponding to a second SIM card identifier, and the second SIM card identifier is a SIM card identifier that has been stored in the connectivity management server and that corresponds to the IoT device. The processing module is further configured to disable the SIM card corresponding to the first SIM card identifier and/or the SIM card corresponding to the second SIM card identifier based on the second message.

In a possible design, the connectivity management server further includes a judging module. The judging module is configured to query a stored device identifier of an IoT device based on the device identifier of the first IoT device. If a SIM card identifier corresponding to the device identifier of the first IoT device has not been stored, the storage module is configured to store the device identifier of the first IoT device and the corresponding first SIM card identifier. If a second SIM card identifier corresponding to the device identifier of the first IoT device has been stored, the storage module is configured to update the second SIM card identifier to the first SIM card identifier.

In a possible design, the processing module is further configured to resume, based on the data synchronization message, the SIM card corresponding to the first SIM card identifier.

For technical effects brought by any solution in the sixth aspect, refer to the technical effects brought by different solutions in the third aspect. Details are not described herein again.

According to a seventh aspect, an embodiment provides a device management server. The device management server includes a memory and at least one processor. The memory stores program code, and the processor invokes the program code to perform some or all of the steps of any method in the first aspect.

According to an eighth aspect, an embodiment provides a chip. The chip is disposed in a device management server, and the chip includes a memory and at least one processor. The memory stores program code, and the processor invokes the program code to perform some or all of the steps of any method in the first aspect.

According to a ninth aspect, an embodiment provides a computer-readable storage medium, and the computer-readable storage medium stores program code. The program code includes instructions used to perform some or all steps of any method in the first aspect.

According to a tenth aspect, an embodiment provides a computer program product. When the computer program product runs on a computer, the computer is enabled to perform some or all of the steps of any method in the first aspect.

For technical effects brought by any solution in the seventh aspect to the tenth aspect, refer to the technical effects brought by different solutions in the first aspect. Details are not described herein again.

According to an eleventh aspect, an embodiment provides an IoT device. The IoT device includes a memory and at least one processor. The memory stores program code, and the processor invokes the program code to perform some or all of the steps of any method in the second aspect.

According to a twelfth aspect, an embodiment provides a chip. The chip is disposed in an IoT device, and the chip includes a memory and at least one processor. The memory stores program code, and the processor invokes the program code to perform some or all of the steps of any method in the second aspect.

According to a thirteenth aspect, an embodiment provides a computer-readable storage medium, and the computer-readable storage medium stores program code. The program code includes instructions used to perform some or all steps of any method in the second aspect.

According to a fourteenth aspect, an embodiment provides a computer program product. When the computer program product runs on a computer, the computer is enabled to perform some or all of the steps of any method in the second aspect.

For technical effects brought by any solution in the eleventh aspect to the fourteenth aspect, refer to the technical effects brought by different solutions in the second aspect. Details are not described herein again.

According to a fifteenth aspect, an embodiment provides a connectivity management server. The connectivity management server includes a memory and at least one processor. The memory stores program code, and the processor invokes the program code to perform some or all of the steps of any method in the third aspect.

According to a sixteenth aspect, an embodiment provides a chip. The chip is disposed in a connectivity management server, and the chip includes a memory and at least one processor. The memory stores program code, and the processor invokes the program code to perform some or all of the steps of any method in the third aspect.

According to a seventeenth aspect, an embodiment provides a computer-readable storage medium, and the computer-readable storage medium stores program code. The program code includes instructions used to perform some or all steps of any method in the third aspect.

According to an eighteenth aspect, an embodiment provides a computer program product. When the computer program product runs on a computer, the computer is enabled to perform some or all of the steps of any method in the third aspect.

For technical effects brought by any solution in the fifteenth aspect to the eighteenth aspect, refer to the technical effects brought by different solutions in the third aspect. Details are not described herein again.

According to a nineteenth aspect, an embodiment provides an IoT data management system, including a device management server and a connectivity management server. The device management server is the device management server according to any one of the fourth aspect or the seventh aspect. The connectivity management server is the connectivity management server according to any one of the sixth aspect or the fifteenth aspect.

For technical effects brought by any solution in the nineteenth aspect, refer to the technical effects brought by different solutions in the first aspect and the third aspect. Details are not described herein again.

According to a twentieth aspect, an embodiment provides an IoT data management system, including a device management server, an IoT device, and a connectivity management server. The device management server is the device management server according to any one of the fourth aspect or the seventh aspect. The IoT device of the twentieth aspect is according to any one of the fifth aspect or the eleventh aspect. The connectivity management server is the connectivity management server according to any one of the sixth aspect or the fifteenth aspect.

For technical effects brought by any solution in the twentieth aspect, refer to the technical effects brought by different solutions in the first aspect to the third aspect. Details are not described herein again.

According to a twenty-first aspect, an embodiment provides an IoT data management method, including: A device management server receives a data report message sent by an IoT device, where the data report message carries a device identifier of the IoT device and a first SIM card identifier, and the first SIM card identifier is an identifier of a SIM card in the IoT device. The device management server stores the device identifier and the corresponding first SIM card identifier. The device management server may further send a data synchronization message to a connectivity management server, where the data synchronization message carries the device identifier and the first SIM card identifier. The connectivity management server stores the device identifier and the corresponding first SIM card identifier.

The device management server and the connectivity management server may further perform some or all of the steps of any method in the first aspect or the third aspect. For technical effects brought by any solution in the twenty-first aspect, refer to the technical effects brought by different solutions in the first aspect and the third aspect. Details are not described herein again.

According to a twenty-second aspect, an embodiment provides an IoT data management method, including: An IoT device obtains a device identifier of the IoT device and a first SIM card identifier, where the first SIM card identifier is an identifier of a SIM card in the IoT device. The IoT device sends a data report message to a device management server, where the data report message carries the device identifier of the IoT device and the first SIM card identifier. The device management server stores the device identifier and the corresponding first SIM card identifier based on the received data report message.

In a possible design, the device management server may further send a data synchronization message to a connectivity management server, where the data synchronization message carries the device identifier and the first SIM card identifier. The connectivity management server stores the device identifier and the corresponding first SIM card identifier.

The IoT device, the device management server, and the connectivity management server may further perform some or all of the steps of any method in the first aspect to the third aspect. For technical effects brought by any solution in the twenty-first aspect, refer to the technical effects brought by different solutions in the first aspect to the third aspect. Details are not described herein again.

DETAILED DESCRIPTION

The following describes the embodiments with reference to the accompanying drawings in the embodiments.

To make a person skilled in the art understand the technical solutions better, the following clearly describes the technical solutions in the embodiments with reference to the accompanying drawings in the embodiments. It is clearly that the described embodiments are merely a part rather than all of the embodiments. All other embodiments obtained by a person of ordinary skill in the art based on the embodiments without creative efforts shall fall within the protection scope of this disclosure.

In the descriptions, "/" represents an "or" relationship between associated objects unless otherwise specified. For example, A/B may represent A or B. The term "and/or" indicates only an association relationship for describing associated objects and indicates that three relationships may exist. For example, A and/or B may represent the following three cases: Only A exists, both A and B exist, and only B exists, where A and B may be singular or plural. In addition, terms such as "first" and "second" are used to distinguish between same objects or similar objects whose functions and purposes are basically the same, to clearly describe the technical solutions in the embodiments. A person skilled in the art may understand that the terms such as "first" and "second" do not limit a quantity or an execution sequence, and the terms such as "first" and "second" do not indicate a definite difference.

It should be understood that the technical solutions may be applied to various communications systems, for example, a cellular-based narrowband IoT (NB-IoT) system, a Global System for Mobile Communications (GSM), a code-division multiple access (CDMA) system, a wideband CDMA (WCDMA) system, a General Packet Radio Service (GPRS), a Long-Term Evolution (LTE) system, an LTE frequency-division duplex (FDD) system, LTE time-division duplex (TDD), a Universal Mobile Telecommunications System (UMTS), a Worldwide Interoperability for Microwave Access (WiMAX) communications system, a 5th generation (5G) system, and a future network.

Figure 1:
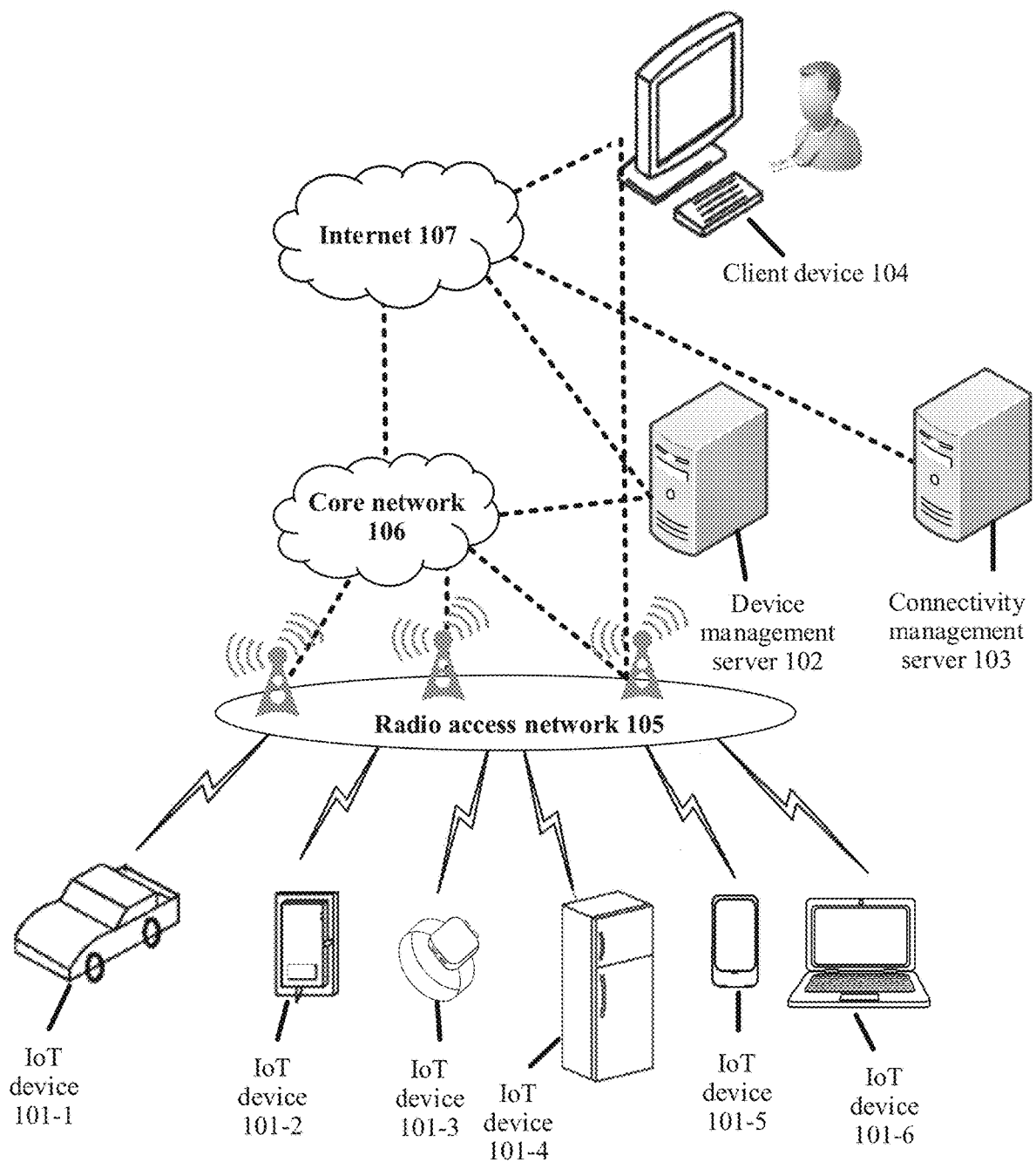
FIG. 1 is a schematic architectural diagram of a system according to an embodiment.

FIG. 1 is a schematic architectural diagram of a system according to an embodiment. The system includes an IoT device 101, a device management server 102, a connectivity management server 103, a client device 104, and the like.

The IoT device 101 may be coupled to a radio access network (RAN) 105 through an air interface, and further coupled to a core network (CN) 106. The core network 106 is coupled to an internet 107. Therefore, the IoT device 101 may communicate with another device coupled to the internet 107. For example, the IoT device 101 may communicate with the device management server 102, and provide collected information to the device management server 102. It should be understood that "coupling" includes a wired connection and/or a wireless connection.

The IoT device 101 may be a smart vehicle-mounted device 101-1, an instrument 101-2, a wearable device 101-3, a smart device 101-4 in a home network, various sensor devices, or the like. The IoT device 101 may alternatively be a communications device such as a hand-held device 101-5, a laptop device 101-6, or a computer.

It should be understood that, for some devices that do not have a communication function, the IoT device 101 may be a combination of one or more devices that do not have a communication function and one device or module (for example, a circuit board or an IoT hub) that has a communication function. For example, for a meter that does not have a communication function, the meter and a meter reading device are combined to form one IoT device 101. The meter reading device reads information such as electricity consumption data from the meter, and communicates with a device such as the device management server 102 over a communications network (the radio access network 105, the core network 106, or the like).

The IoT device 101 may obtain a device identifier of the IoT device 101 and a SIM card identifier of a SIM card in the IoT device 101, and may report the device identifier and the SIM card identifier to the device management server 102. FIG. 1 shows only several IoT devices as examples. In actual application, there may be a plurality of IoT devices of a same type, or a plurality of IoT devices of different types.

The device management server 102 may be coupled to the core network 106, and then coupled to the internet 107. The device management server 102 may alternatively be directly coupled to the internet 107 (through an Ethernet connection, Wi-Fi, or an 802.11 network connection). Therefore, the device management server 102 may communicate with another device coupled to the internet 107. For example, the device management server 102 may communicate with the client device 104, and provide information about the IoT device 101 to the client device 104.

The device management server 102 is a server that provides device management, for example, provides services such as unified device modeling, device verification, device authentication, device upgrade, device configuration, data subscription, command delivery, and data storage and archiving.

The device management server 102 may further receive and store the device identifier and a corresponding first SIM card identifier that are reported by the IoT device 101, and may synchronize the device identifier and the corresponding first SIM card identifier to the connectivity management server 103. Further, the device management server 102 may further query whether a second SIM card identifier corresponding to the device identifier has been stored; and if the second SIM card identifier has been stored, update the second SIM card identifier to the first SIM card identifier. Further, the device management server 102 may further query a device-card binding status of the IoT device 101. If device-card binding has been set, the device management server 102 does not update the second SIM card identifier temporarily, but sends, to the client device 104, a notification that device-card binding has been set for the IoT device 101. Further, the device management server 102 may receive a notification, sent by the client device 104, that device-card unbinding is performed on the IoT device 101, and update the second SIM card identifier to the first SIM card identifier.

The connectivity management server 103 may be directly coupled to the internet 107. Therefore, the connectivity management server 103 may communicate with another device coupled to the internet 107. For example, the connectivity management server 103 may communicate with the device management server 102. The connectivity management server 103 may be further coupled to a business and operation support system (BOSS) server, a home subscriber server (HSS), or a unified data management (UDM) device.

The connectivity management server 103 is a server that provides connectivity management, for example, provides a SIM card-related management service, including package subscription management, life cycle management, traffic query, connection diagnosis, and an automation rule of a SIM card.

The connectivity management server 103 may receive and store the device identifier and the corresponding first SIM card identifier that are sent by the device management server 102. Further, the connectivity management server 103 may further query whether the second SIM card identifier corresponding to the device identifier has been stored in the IoT device 101; and if the second SIM card identifier has been stored, update the second SIM card identifier to the first SIM card identifier. Further, the connectivity management server 103 may further receive a notification, sent by the device management server 102, that a SIM card corresponding to the second SIM card identifier is disabled, and disable the SIM card.

The client device 104 is a terminal device that provides running of a client. A user may use the client to access an IoT management platform such as the device management server 102 and the connectivity management server 103, and further manage the IoT device 101. For example, the user may use the client to view or modify settings of the IoT device 101, view a working status of the IoT device 101, and deliver a control command to the IoT device 101. The client may be specifically an IoT application, a web application, or the like. The terminal device includes but is not limited to a computer, a hand-held or laptop device, for example, a mobile phone, a tablet computer, or a personal digital assistant.

The client device 104 may be coupled to the radio access network 105 through an air interface, then coupled to the core network 106, and coupled to the internet 107. The client device 104 may alternatively be directly connected to the internet 107 (through an Ethernet connection, Wi-Fi, or an 802.11 network connection).

The user may set the device-card binding status of the IoT device 101 by using the client device 104. The client device 104 may receive the notification, sent by the device management server 102, that device-card binding has been set for the IoT device 101, and display, to the user, a prompt that device-card binding has been set for the IoT device 101. The client device 104 may further perform device-card unbinding on the IoT device 101 based on an operation of the user, and send, to the device management server 102, the notification that device-card unbinding is performed on the IoT device 101.

Figure 2:
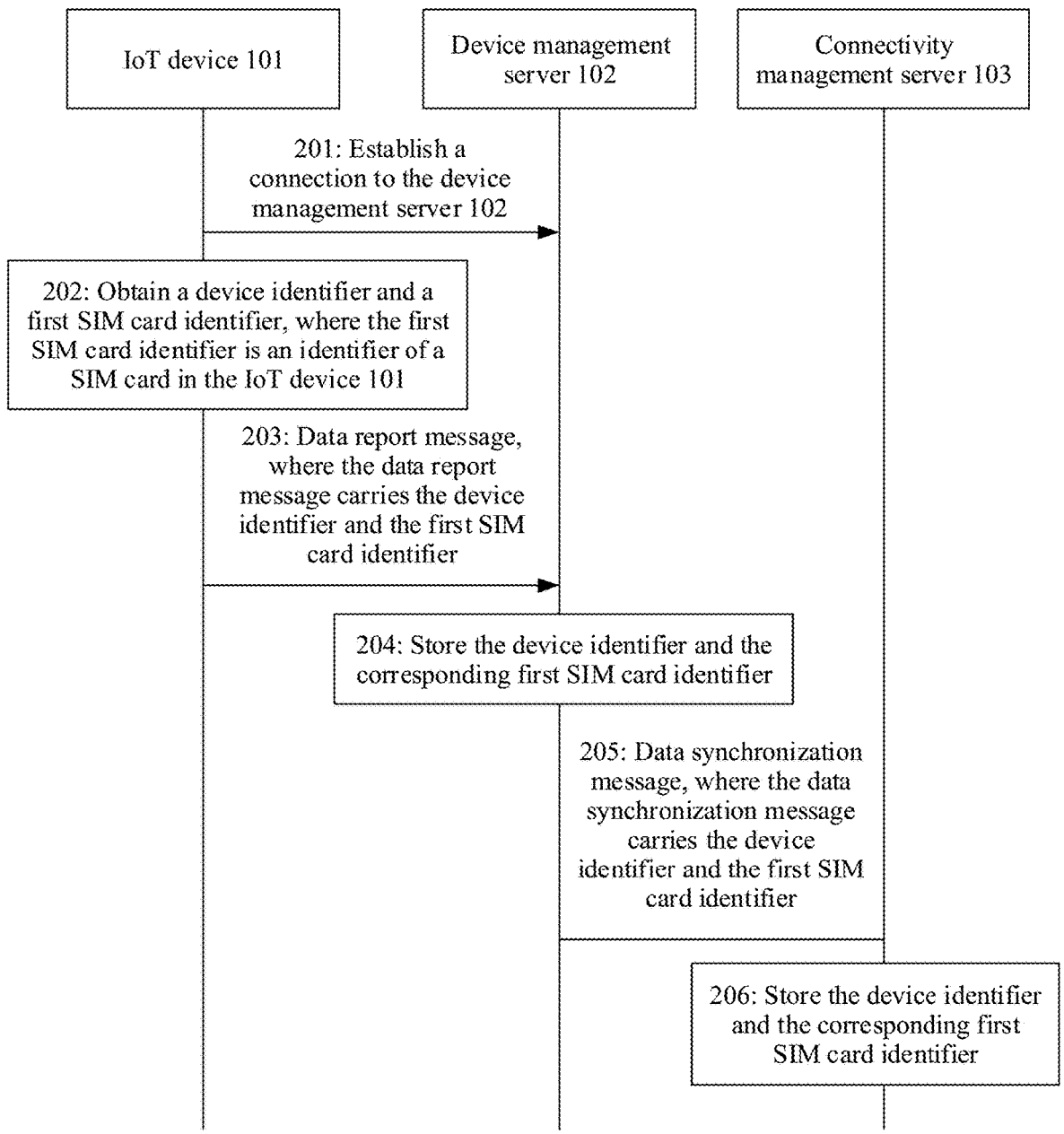
FIG. 2 is a schematic diagram of an IoT device data management method according to an embodiment.

FIG. 2 is a schematic flowchart of an IoT device data management method according to an embodiment. In this embodiment, an IoT device 101 reports a device identifier and a first SIM card identifier to a device management server 102. The device management server 102 stores the device identifier and the first SIM card identifier, and synchronizes the device identifier and the first SIM card identifier to a connectivity management server 103. Steps in FIG. 2 include steps 201 to 206, and are described in detail below.

201: The IoT device 101 establishes a connection to the device management server 102.

After being powered on, the IoT device 101 establishes the connection to the device management server 102. Optionally, when the IoT device 101 has established the connection to the device management server 102, the IoT device 101 may re-establish a connection after a SIM card is replaced.

There are a plurality of connection manners, including but not limited to:

(1) MQTT direct connection: The IoT device 101 reads a preset address of the device management server 102, and sends a connection establishment request message to the device management server 102 according to the address. The message is an MQTT message, and is specifically a message of a CONNECT type. The IoT device 101 may determine, after sending the message, that the connection to the device management server 102 has been established, or may determine, after receiving a connection success response returned by the device management server 102, that the connection to the device management server 102 has been established.

(2) CoAP direct connection: The IoT device 101 reads a preset address of the device management server 102, and sends a connection establishment request message to the device management server 102 according to the address. The message is a CoAP message, and is specifically a message of a CON type (a request requiring acknowledgment) or a message of a NON type (a request requiring no acknowledgment). When the message is a message of a CON type, the IoT device 101 determines, after receiving a connection success response returned by the device management server 102, that the connection to the device management server 102 has been established. When the message is a message of a NON type, the IoT device 101 determines, after sending the message, that the connection to the device management server 102 has been established.

(3) Connection after encrypted Hypertext Transfer Protocol Secure (HTTPS) authentication: After performing device authentication by using HTTPS, the IoT device 101 obtains an address of the device management server 102, and may further obtain a certificate of the device management server 102. The IoT device 101 may be connected to the device management server 102 after successfully authenticating the device management server 102. A connection method is similar to the direct connection method in (1) or (2), and details are not described herein again.

It should be understood that the IoT device 101 may further establish the connection to the device management server 102 after establishing a connection to the connectivity management server 103.

In addition, before establishing the connection to the device management server 102, the IoT device 101 further establishes a connection to a communications network (for example, a radio access network 105, or a core network 106). A person skilled in the art can grasp a plurality of methods for establishing the connection between the IoT device 101 and the communications network. Details are not described herein.

202: The IoT device 101 obtains the device identifier of the IoT device 101 and the first SIM card identifier, where the first SIM card identifier is an identifier of a SIM card in the IoT device 101.

The device identifier is an identifier of the IoT device 101, and may be specifically an international mobile equipment identity (IMEI), or the like. The IoT device 101 obtains the device identifier of the IoT device 101. The device identifier may be preset, or obtained by reading an embedded bar code.

The first SIM card identifier is the identifier of the SIM card in the IoT device 101, and the first SIM card identifier may be specifically an international mobile subscriber identity (IMSI), a subscription permanent identifier (SUFI), or the like. A SIM card is a smart card used to store subscriber identity data, for example, a conventional pluggable SIM card, an embedded SIM (eSIM) card, or a system-on-a-chip (SOC) SIM card.

Optionally, the IoT device 101 may further determine whether a second SIM card identifier has been stored. If the second SIM card identifier has not been stored, it indicates that the first SIM card identifier is obtained after the IoT device 101 is powered on for the first time. If the second SIM card identifier has been stored, the first SIM card identifier may be further compared with the second SIM card identifier. If the first SIM card identifier is the same as the second SIM card identifier, it indicates that the first SIM card identifier is repeatedly obtained. The IoT device 101 may continue to perform the following steps (periodic reporting), or may not continue to perform the following steps. If the first SIM card identifier is different from the second SIM card identifier, it indicates that the first SIM card identifier is obtained after the SIM card is replaced, and the IoT device 101 may continue to perform the following steps.

It should be understood that step 202 may be performed after the IoT device 101 is powered on, or step 202 may be performed after the SIM card is replaced. Replacing the SIM card may be taking out the original SIM card and inserting a new SIM card, or updating information in the SIM card, for example, updating information such as a SIM card identifier and subscriber identity data of an eSIM card or a SOC SIM card.

In addition, the IoT device 101 may perform step 202 before step 201, or may simultaneously perform step 202 and step 201.

203: The IoT device 101 sends a data report message to the device management server 102, where the data report message carries the device identifier of the IoT device 101 and the first SIM card identifier.

The data report message may be an MQTT message, and may be specifically a message of a CONNECT type or a message of a SUBSCRIBE type. The data report message may alternatively be a CoAP message, and may be specifically a message of a CON type or a message of a NON type.

The address of the device management server 102 may be preset on the IoT device 101, or obtained by the IoT device 101 after authentication. For details, refer to the descriptions in step 201. A case for a port is similar, and details are not described herein. Specifically, the IoT device 101 sends the data report message to the device management server 102 according to the address and/or the port of the device management server 102.

The device identifier and the corresponding first SIM card identifier that are carried in the data report message may have an agreed-upon format. Optionally, the device identifier and the first SIM card identifier are connected by using a special symbol, for example, a dash "-" or a comma ",".

Optionally, the device identifier and the first SIM card identifier are indicated by using two parameters respectively. For example, the device identifier is indicated by using a parameter "IMEI", and the first SIM card identifier is indicated by using a parameter "IMSI".

The IoT device 101 may send the data report message to the device management server 102 after being powered on for the first time, which may be referred to as first reporting. The IoT device 101 may also send the data report message to the device management server 102 after the SIM card is replaced, which may be referred to as SIM card replacement reporting.

In addition, the IoT device 101 may further periodically send the data report message to the device management server 102. A sending period may be preset, or determined based on an indication of the device management server 102.

The IoT device 101 may further send the data report message based on an indication of the device management server 102. For example, the IoT device 101 receives a request message sent by the device management server 102, where the request message is used to indicate the IoT device 101 to report the device identifier and the corresponding SIM card identifier.

In addition, the data report message may further carry an indication of the first reporting or an indication of the SIM card replacement reporting. For example, the data report message includes an indication bit of a report type. If the indication bit is 0, it indicates that current reporting is the first reporting; and if the indication bit is 1, it indicates that current reporting is the SIM card replacement reporting. Alternatively, the data report message carries the indication of the first reporting, and when the data report message carries no indication, it indicates that current reporting is the SIM card replacement reporting by default. Alternatively, the data report message carries the indication of the SIM card replacement reporting, and when the data report message carries no indication, it indicates that current reporting is the first reporting by default.

204: The device management server 102 stores the device identifier of the IoT device 101 and the corresponding first SIM card identifier.

The device management server 102 receives the data report message sent by the IoT device 101, and obtains the device identifier of the IoT device 101 and the first SIM card identifier from the data report message. Specifically, the device management server 102 may separately obtain the device identifier of the IoT device 101 and the first SIM card identifier based on the agreed-upon format.

The device management server 102 stores and maintains device identifiers of a plurality of IoT devices and corresponding SIM card identifiers. After receiving the data report message sent by the IoT device 101, the device management server 102 may query a stored device identifier of the IoT device based on the device identifier of the IoT device 101 carried in the data report message, to determine whether the IoT device 101 has reported the device identifier and the SIM card identifier. Alternatively, the device management server 102 may perform the determining based on the indication of the first reporting or the indication of the SIM card replacement reporting carried in the data report message.

If the device management server 102 does not store the device identifier of the IoT device 101, or does not store the SIM card identifier corresponding to the device identifier of the IoT device 101, the device management server 102 determines that the current reporting is the first reporting of the IoT device 101. Alternatively, the device management server 102 determines, based on the indication in the data report message, that the current reporting is the first reporting of the IoT device 101. When the current reporting is the first reporting, the device management server 102 directly stores the device identifier of the IoT device 101 and the corresponding first SIM card identifier. There are a plurality of storage manners, provided that a correspondence between the device identifier of the IoT device 101 and the first SIM card identifier can be established. The device management server 102 may store the device identifier of the IoT device 101 and the first SIM card identifier in a table, for example, store the device identifier of the IoT device 101 and the first SIM card identifier in a same row or a same column. Alternatively, the device management server 102 may store the device identifier of the IoT device 101 and the first SIM card identifier in a format of connecting the device identifier of the IoT device 101 and the first SIM card identifier by using a special symbol, for example, a dash "-" or a comma ",".

The device management server 102 may directly query the stored device identifier of the IoT device and the SIM card identifier based on the device identifier of the IoT device 101, to determine the second SIM card identifier corresponding to the stored device identifier of the IoT device 101. Alternatively, the device management server 102 may determine, based on the indication in the data report message, that the current reporting is the SIM card replacement reporting of the IoT device 101, and further determine that the second SIM card identifier has been stored.

If the device management server 102 has stored the second SIM card identifier, the device management server 102 may directly update the second SIM card identifier to the first SIM card identifier. Alternatively, the device management server 102 may further determine whether the second SIM card identifier is the same as the first SIM card identifier.

If the second SIM card identifier is the same as the first SIM card identifier, the device management server 102 does not perform a subsequent operation.

If the second SIM card identifier is different from the first SIM card identifier, the device management server 102 may update the second SIM card identifier to the first SIM card identifier. Alternatively, the device management server 102 may further query a device-card binding status of the IoT device 101. The device-card binding status indicates whether a binding relationship exists between the IoT device and a SIM card, and includes a state that device-card binding has been set, that is, the device-card binding relationship exists, and a state that device-card binding has not been set, that is, no binding relationship exists. It should be understood that the second SIM card identifier corresponds to the IoT device 101, and the device-card binding status of the IoT device 101 is a device-card binding status for the second SIM card identifier. The device-card binding status of the IoT device 101 is used as an example for description.

If device-card binding has not been set for the IoT device 101, the device management server 102 directly updates the second SIM card identifier to the first SIM card identifier.

If device-card binding has been set for the IoT device 101, the device management server 102 cannot perform an update operation temporarily, but needs to wait until a user performs device-card unbinding on the IoT device 101, and then perform the update operation. For details, refer to the descriptions in an embodiment shown in FIG. 3A and FIG. 3B. Details are not described herein.

205: The device management server 102 sends a data synchronization message to the connectivity management server 103, where the data synchronization message carries the device identifier of the IoT device 101 and the corresponding first SIM card identifier.

The data synchronization message may be an MQTT message, and may be specifically a message of a CONNECT type or a message of a SUBSCRIBE type. The data synchronization message may alternatively be a CoAP message, and may be specifically a message of a CON type or a message of a NON type.

The device identifier and the corresponding first SIM card identifier that are carried in the data synchronization message may have an agreed-upon format. For details, refer to the descriptions in step 203, and details are not described herein again.

The data synchronization message may also carry an indication of first synchronization or an indication of SIM card replacement synchronization, and an implementation method is similar to an implementation method for the indication of the first reporting or the indication of the SIM card replacement reporting in step 203. The reporting in step 203 is replaced with synchronization. For details, refer to the descriptions in step 203. Details are not described herein again.

206: The connectivity management server 103 stores the device identifier of the IoT device 101 and the corresponding first SIM card identifier.

The connectivity management server 103 receives the data synchronization message sent by the device management server 102, and obtains the device identifier of the IoT device 101 and the first SIM card identifier from the data synchronization message. Specifically, the connectivity management server 103 may separately obtain the device identifier of the IoT device 101 and the first SIM card identifier based on the agreed-upon format.

The connectivity management server 103 may also store and maintain device identifiers of a plurality of IoT devices and corresponding SIM card identifiers. After receiving the data synchronization message sent by the device management server 102, the connectivity management server 103 may query a stored device identifier of the IoT device based on the device identifier of the IoT device 101 carried in the data synchronization message, to determine whether the device management server 102 has synchronized the SIM card identifier of the IoT device 101. Alternatively, the connectivity management server 103 may perform the determining based on the indication of the first synchronization or the indication of the SIM card replacement synchronization carried in the data synchronization message.

The connectivity management server 103 may determine, based on a case that the device identifier of the IoT device 101 is not stored or a case that the SIM card identifier corresponding to the device identifier of the IoT device 101 is not stored, or based on the indication in the data synchronization message, that current synchronization is the first synchronization about the IoT device 101. The device management server 102 directly stores the device identifier of the IoT device 101 and the corresponding first SIM card identifier. There are a plurality of storage manners, provided that the correspondence between the device identifier of the IoT device 101 and the first SIM card identifier can be established. For details, refer to the descriptions in step 204. Details are not described herein again.

The connectivity management server 103 may query the stored device identifier of the IoT device based on the device identifier of the IoT device 101, and determine that the second SIM card identifier corresponding to the stored device identifier of the IoT device 101 has been stored. Alternatively, the connectivity management server 103 may determine, based on the indication in the data synchronization message, that the current synchronization is the SIM card replacement synchronization about the IoT device 101, and further determine that the second SIM card identifier has been stored.

If the connectivity management server 103 has stored the second SIM card identifier, the connectivity management server 103 may directly update the second SIM card identifier to the first SIM card identifier.

Sequence numbers of the steps may not represent an execution sequence. For example, step 205 may be performed during performing steps 203 and 204. In addition, each step is not necessarily performed. For example, if the device manager 102 has stored the second SIM card identifier corresponding to the device identifier of the IoT device 101, and the second SIM card identifier is the same as the first SIM card identifier, steps 205 and 206 are not performed. In addition, some steps may be repeatedly performed. For example, if the SIM card in the IoT device 101 is replaced again, steps 202 to 206 are repeatedly performed. Alternatively, if the IoT device 101 periodically reports the device identifier and the SIM card identifier, steps 202 to 204 are repeatedly performed.

In the IoT device data management method provided, after obtaining the device identifier and the first SIM card identifier, the IoT device 101 reports the device identifier and the first SIM card identifier to the device management server 102 by using the data report message. The device management server 102 stores the device identifier and the corresponding first SIM card identifier, so that the device management server 102 establishes and maintains the correspondence between the device identifier of the IoT device 101 and the SIM card identifier. In addition, the device management server 102 synchronizes the device identifier and the first SIM card identifier to the connectivity management server 103, so that the connectivity management server 103 also establishes and maintains the correspondence. When the device management server 102 and the connectivity management server 103 need to be cooperatively used, the device management server 102 and the connectivity management server 103 may query the correspondence to invoke each other. For example, when the device management server 102 requires SIM card information, the device management server 102 may query the correspondence based on the device identifier of the IoT device 101 to determine the corresponding first SIM card identifier, and then request the required SIM card information from the connectivity management server 103 based on the SIM card identifier. This facilitates mutual cooperation between the device management server 102 and the connectivity management server 103. In addition, the IoT device 101 reports the device identifier and the first SIM card identifier. This improves data collection and management efficiency, and can also avoid a data error.

For example, a power grid company A enables a smart meter reading service. If meters in a jurisdiction area of the power grid company A are meters having a communication function, these meters are a plurality of IoT devices 101. Specifically, the meter is provided with a SIM card slot, and a SIM card may be inserted. Alternatively, the meter is provided with a module (a chip or a circuit board including a plurality of chips) having a communication function, and the module includes at least one communications module that can store eSIM or SOC SIM related information. If these meters do not have the communication function, a meter reading device needs to be configured to implement the communication function. In this case, the meter reading device is provided with a SIM card slot, and a SIM card may be inserted. Alternatively, the meter reading device is provided with a module having a communication function, and the module includes at least one communications module that can store eSIM or SOC SIM related information. The meter and the meter reading device are combined to form an IoT device 101. Description is provided by using an example in which the meter has the communication function.

An intelligent meter reading management platform of the power grid company A includes devices such as a device management server 102 and a connectivity management server 103. The device management server 102 collects information such as electricity consumption data reported by the meter, and is responsible for providing device management of the meter, such as meter upgrade, meter configuration, meter authentication, and command delivery. The connectivity management server 103 is responsible for providing meter connectivity management, for example, providing a related management service of a SIM card in the meter.

In step 201, installation of a meter A505 has just been completed in home of a user A in the jurisdiction area of the power grid company A. After being powered on for the first time, the meter A505 accesses a communications network (including authentication between the meter and a communications network device). Then, the meter A505 can communicate with the device management server 102, and then the meter A505 establishes a connection to the device management server 102.

In step 202, the meter A505 may obtain a device identifier of the meter A505 and a first SIM card identifier, where the first SIM card identifier is an identifier of a SIM card in the meter A505. If the SIM card in the meter A505 is an inserted SIM card, an identifier of the SIM card is read. If the SIM card in the meter A505 is an embedded eSIM card or an SOC SIM card, a written identifier of the eSIM card or a written identifier of the SOC SIM card is read. For example, the device identifier of the meter A505 is A505, and the first SIM card identifier is 1234567805.

In step 203, the meter A505 sends a data report message to the device management server 102, where the data report message carries the device identifier of the meter A505 and the first SIM card identifier, for example, includes a field "A505-1234567805". The device management server 102 receives the data report message, and determines, based on the data report message, that the device identifier of the meter A505 is A505 and the first SIM card identifier is 1234567805.

In step 204, the device management server 102 stores and maintains device identifiers of a plurality of meters and corresponding SIM card identifiers, as shown in Table 1.

TABLE 1

Device identifiers of N meters and SIM card identifiers (where N is an integer greater than or equal to 0)

| Device identifier | SIM card identifier |
|---|---|
| . . . | . . . |
| A500 | 1234567800 |
| A501 | 1234567801 |

TABLE 1-continued

Device identifiers of N meters and SIM card identifiers (where N is an integer greater than or equal to 0)

| Device identifier | SIM card identifier |
|---|---|
| A502 | 1234567802 |
| A503 | 1234567803 |
| A504 | 1234567804 |

The device management server 102 queries A505 in Table 1, to determine whether the meter A505 has reported the device identifier and the SIM card identifier. If the device identifier of the meter A505 and the SIM card identifier has not been stored in Table 1, the device management server 102 determines that current reporting is first reporting of the meter A505, and the device management server 102 directly stores the device identifier A505 and the corresponding first SIM card identifier 1234567805 in Table 1, to obtain the following Table 2.

TABLE 2

Device identifiers of N + 1 meters and SIM card identifiers

| Device identifier | SIM card identifier |
|---|---|
| . . . | . . . |
| A500 | 1234567800 |
| A501 | 1234567801 |
| A502 | 1234567802 |
| A503 | 1234567803 |
| A504 | 1234567804 |
| A505 | 1234567805 |

In step 205, the device management server 102 sends a data synchronization message to the connectivity management server 103, where the data synchronization message carries the device identifier of the meter A505 and the first SIM card identifier, for example, includes the field "A505-1234567805".

In step 206, the connectivity management server 103 stores the device identifier of the meter A505 and the corresponding first SIM card identifier. For details, refer to the descriptions in the foregoing steps. Details are not described herein again.

In this way, both the device management server 102 and the connectivity management server 103 of the power grid company A each establish and maintain correspondences between the device identifiers of the plurality of meters and the SIM card identifiers. When the device management server 102 and the connectivity management server 103 need to be cooperatively used, the device management server 102 and the connectivity management server 103 may query the correspondences to invoke each other. This facilitates mutual cooperation between the device management server 102 and the connectivity management server 103. For example, when determining that the meter A505 cannot operate normally, the device management server 102 needs to further determine a reason why the meter A505 cannot operate normally. The device management server 102 may query the stored correspondences between the device identifiers of the meters and the SIM card identifiers, to determine that the SIM card identifier of the meter A505 is 1234567805. Further, the device management server 102 requests, from the connectivity management server 103, a usage status of the SIM card account with SIM card identifier 1234567805, to determine whether the reason why the meter A505 cannot operate normally is that traffic of the SIM card is used up.

Figure 3A:
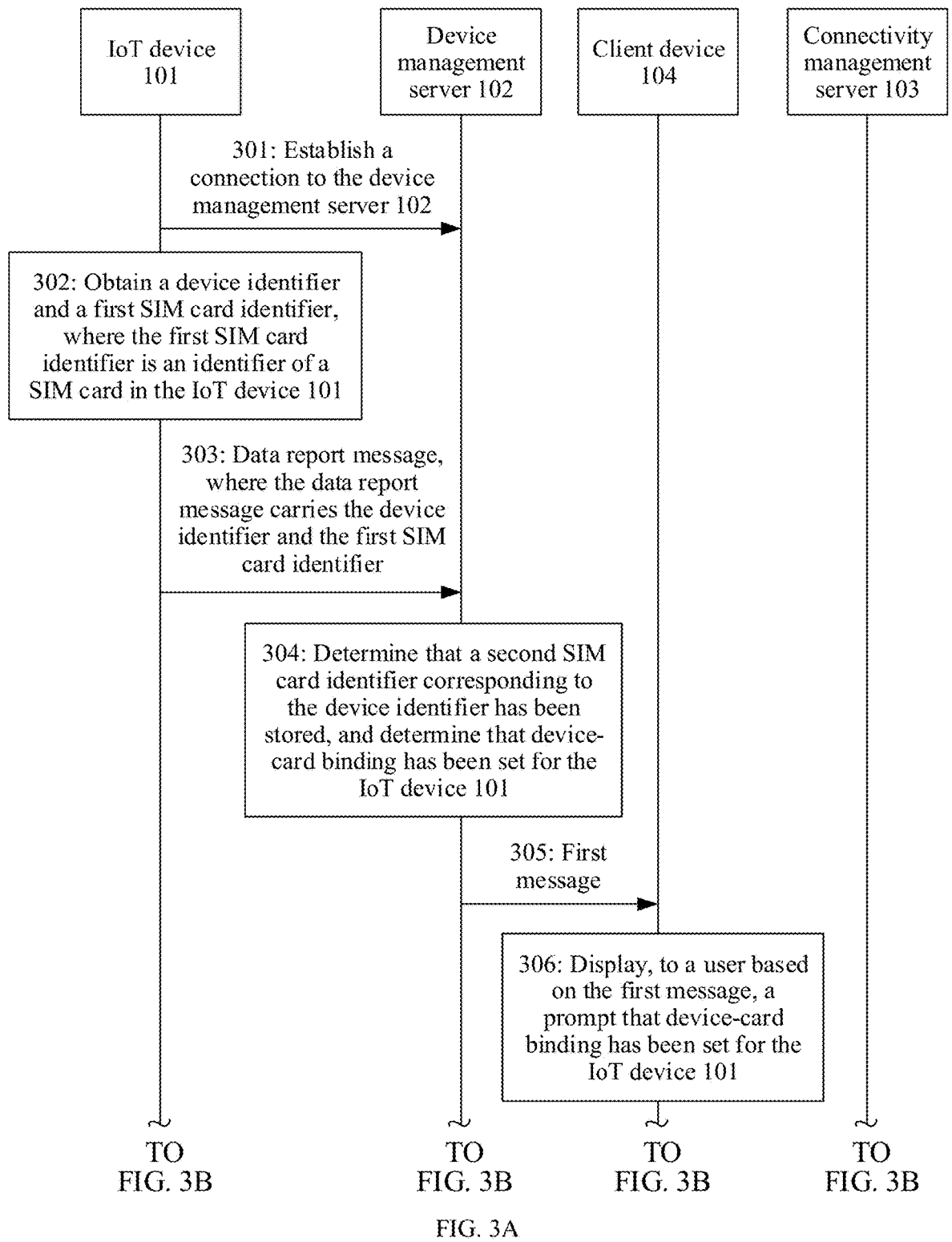
FIG. 3A and FIG. 3B are a schematic diagram of another IoT device data management method according to an embodiment.
Figure 3B:
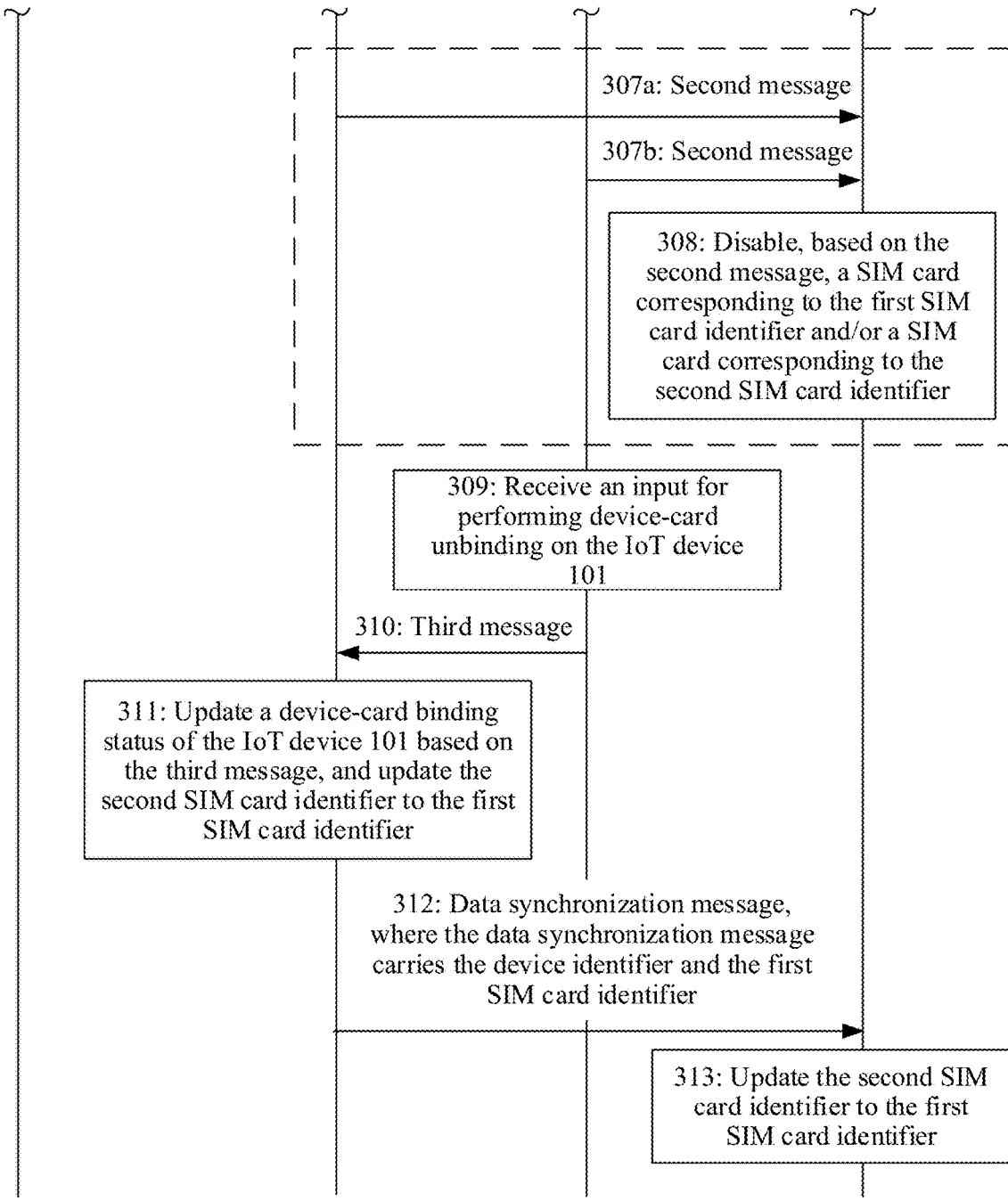

FIG. 3A and FIG. 3B are a schematic flowchart of another IoT device data management method according to an embodiment. An IoT device 101 reports a device identifier and a first SIM card identifier to a device management server 102. The device management server 102 determines that a second SIM card identifier corresponding to the device identifier has been stored, further determines a device-card binding status of the IoT device 101, and performs a further operation based on the device-card binding status. Steps in FIG. 3A and FIG. 3B include steps 301 to 313. Steps 301 to 303 are the same as steps 201 to 203 in the embodiment shown in FIG. 2, and details are not described herein again. Steps 304 to 313 are described in detail below.

304: The device management server 102 determines that the second SIM card identifier corresponding to the device identifier of the IoT device 101 has been stored, and determines that device-card binding has been set for the IoT device 101.

The device management server 102 receives a data report message sent by the IoT device 101, and further determines, based on the data report message, that the second SIM card identifier has been stored. For details, refer to the descriptions in step 204 in the embodiment shown in FIG. 2. Details are not described herein again.

If the second SIM card identifier is different from the first SIM card identifier carried in the data report message, the device management server 102 may further determine the device-card binding status of the IoT device 101.

The device management server 102 may store and maintain device-card binding statuses of a plurality of IoT devices. The device management server 102 may directly query the device-card binding status of the IoT device 101 locally. Specifically, the corresponding device-card binding status is determined based on the device identifier of the IoT device 101.

The device-card binding statuses of the plurality of IoT devices stored in the device management server 102 may be preset. For example, during subscription, a user determines to set device-card binding for the IoT device 101, or if the user does not perform the determining, it indicates that device-card binding has not been set by default. The device-card binding status may alternatively be set by the user by using a client device 104.

The device-card binding status of the IoT device may also be stored in another server, for example, in an HSS or a UDM device on an operator side. The device management server 102 may request the device-card binding status of the IoT device 101 and/or a device-card binding status for a second SIM card from the another server.

If device-card binding has not been set for the IoT device 101, the device management server 102 directly updates the second SIM card identifier to the first SIM card identifier. In addition, the device management server 102 further sends a data synchronization message to a connectivity management server 103. The connectivity management server 103 stores the device identifier of the IoT device 101 and the corresponding first SIM card identifier based on the received data synchronization message. For details, refer to step 205 and step 206 in the embodiment shown in FIG. 2. Details are not described herein again.

If device-card binding has been set for the IoT device 101, the device management server 102 cannot update the second SIM card identifier to the first SIM card identifier temporarily. Optionally, the device management server 102 may cache the device identifier of the IoT device 101 and the corresponding first SIM card identifier. Optionally, the device management server 102 may further set a status of the IoT device 101 to an abnormal status, and then no longer perform an operation on the IoT device 101, or no longer perform an operation with high security sensitivity on the IoT device 101.

305: The device management server 102 sends a first message to the client device 104, where the first message is used to notify the client device 104 that device-card binding has been set for the IoT device 101.

The first message may be an HTTPS message, or a Hypertext Transfer Protocol (HTTP) message.

Optionally, the first message may carry the device identifier of the IoT device 101, and the first message may further carry an indication that device-card binding has been set. For example, the first message includes an indication bit indicating the device-card binding status. When the indication bit is 0, it indicates that device-card binding has been set. Alternatively, the first message carries an indication that device-card binding has been set for the IoT device 101.

Optionally, the first message may carry a prompt that a SIM card in the IoT device 101 fails to be replaced, and a carried failure cause value is that device-card binding has been set.

306: The client device 104 displays, to the user based on the first message, a prompt that device-card binding has been set for the IoT device 101.

After receiving the first message, the device management server 102 sends the prompt to the user. For example, a pop-up window is displayed. The prompt that device-card binding has been set for the IoT device 101 is displayed in the window. Alternatively, an icon indicating that the SIM card in the IoT device 101 fails to be replaced is displayed in the window; and after the user taps the icon, the prompt that device-card binding has been set for the IoT device 101 is further displayed, or the like.

307: The device management server 102 or the client device 104 sends a second message to the connectivity management server 103, where the second message is used to notify the connectivity management server 103 to disable a SIM card corresponding to the first SIM card identifier and/or a SIM card corresponding to the second SIM card identifier.

Optionally, the second message carries the first SIM card identifier, and the second message may further carry an indication for disabling a SIM card. Alternatively, the second message carries an indication for disabling the SIM card corresponding to the first SIM card identifier.

Optionally, the second message carries the second SIM card identifier and/or the device identifier of the IoT device 101, and the second message may further carry an indication for disabling a SIM card. Alternatively, the second message carries an indication for disabling the SIM card corresponding to the second SIM card identifier.

Optionally, the second message carries the first SIM card identifier and the second SIM card identifier, and the second message may further carry an indication for disabling a SIM card. Alternatively, the second message carries an indication for disabling the SIM card corresponding to the first SIM card identifier and the SIM card corresponding to the second SIM card identifier.

SIM cards related to the IoT device 101 include the SIM card corresponding to the first SIM card identifier and the SIM card corresponding to the second SIM card identifier. A specific SIM card to be disabled may be determined according to a policy, or may be set by default.

When device-card binding has been set for the IoT device 101, there is a security risk if the SIM card in the IoT device 101 is replaced. In this case, the connectivity management server 103 disables a related SIM card, to avoid a security problem and improve security.

The following describes two cases of step 307.

307a: The device management server 102 sends the second message to the connectivity management server 103.

The second message may be an MQTT message, and may be specifically a message of a CONNECT type or a message of a SUBSCRIBE type. The second message may alternatively be a CoAP message, and may be specifically a message of a CON type or a message of a NON type.

It should be understood that, after determining that device-card binding has been set for the IoT device 101 in step 304, the device management server 102 may perform step 307a. In other words, there is no time sequence relationship between step 307a and steps 305 and 306.

307b: The client device 104 sends the second message to the connectivity management server 103.

The second message may be an HTTPS message or an HTTP message.

Optionally, after displaying, to the user, the prompt that device-card binding has been set for the IoT device 101, the client device 104 may further display, to the user, whether to change the device-card binding status of the IoT device 101, and send the second message to the connectivity management server 103 if the user refuses to change the device-card binding status.

Optionally, the client device 104 may further display, to the user, an option of whether to disable the related SIM card, and send the second message to the connectivity management server 103 when the user performs an input operation on the option of disabling the related SIM card.

Optionally, after step 305, the client device 104 may be automatically triggered to send the second message to the connectivity management server 103.

308: The connectivity management server 103 disables, based on the second message, the SIM card corresponding to the first SIM card identifier and/or the SIM card corresponding to the second SIM card identifier.

Disabling the SIM card corresponding to the first SIM card identifier means that a connection to a communications network is not provided for the SIM card corresponding to the first SIM card identifier. A case for the second SIM card identifier is similar, and details are not described again.

Optionally, the connectivity management server 103 may further send, to an operator-side server based on the second message, a notification message for disabling the SIM card corresponding to the first SIM card identifier and/or the SIM card corresponding to the second SIM card identifier, to disable the related SIM card. The operator-side server herein may be specifically a BOSS, an HSS, a UDM device, or the like.

Optionally, for an eSIM card or a SOC SIM card, the connectivity management server 103 may remotely delete data (such as user identity data) in the eSIM card or the SOC SIM card, so that the SIM card cannot be connected to a communications network. The SIM card herein is the SIM card corresponding to the first SIM card identifier and/or the SIM card corresponding to the second SIM card identifier.

309: The client device 104 receives an input for performing device-card unbinding on the IoT device 101.

After displaying, to the user, the prompt that device-card binding has been set for the IoT device 101, the client device 104 may further display, to the user, a page for changing the device-card binding status of the IoT device 101, or display a page for changing the device-card binding status of the IoT device 101 based on an operation of the user. The user selects an option of performing device-card unbinding on the IoT device 101, and performs an input operation. A selection manner is not limited, and may be tapping an icon, staring at an icon, or the like.

310: The client device 104 sends a third message to the device management server 102, where the third message is used to notify the device management server 102 that device-card unbinding is performed on the IoT device 101.

The third message may be an HTTPS message or an HTTP message.

Optionally, after receiving the input for performing device-card unbinding on the IoT device 101, the client device 104 may further authenticate the user, for example, request a user credential. The client device 104 sends the third message after the user is authenticated successfully.

The third message may carry the device identifier of the IoT device 101 and an indication for performing device-card unbinding. Alternatively, the third message may carry the device identifier of the IoT device 101 and an updated device-card binding status. The updated device-card binding status is that device-card binding has not been set.

311: The device management server 102 updates the device-card binding status of the IoT device 101 based on the third message, and updates the second SIM card identifier to the first SIM card identifier.

After receiving the third message, the device management server 102 determines a storage location of the device-card binding status of the IoT device 101 based on the device identifier of the IoT device 101 carried in the third message, and updates the device-card binding status to a state that device-card binding has not been set. The device management server 102 may further eliminate the abnormal status of the IoT device 101, for example, set the IoT device 101 to a normal operating status, and then normally perform an operation on the IoT device 101.

After the device management server 102 receives the third message, if the device management server 102 caches the device identifier of the IoT device 101 and the corresponding first SIM card identifier in step 304, the device management server 102 further updates the second SIM card identifier to the first SIM card identifier. Specifically, the device management server 102 determines the corresponding first SIM card identifier based on the device identifier of the IoT device 101 carried in the third message, determines a storage location of the second SIM card identifier based on the device identifier of the IoT device 101, and updates the second SIM card identifier to the first SIM card identifier.

If the device management server 102 does not cache the device identifier of the IoT device 101 and the corresponding first SIM card identifier in step 304, the device management server 102 may indicate the IoT device 101 to send the device identifier of the IoT device 101 and the corresponding first SIM card identifier, and update the second SIM card identifier to the first SIM card identifier. For example, the device management server 102 sends a request message to the IoT device 101, where the request message is used to indicate the IoT device 101 to report the device identifier and the corresponding SIM card identifier.

Alternatively, the device management server 102 may temporarily perform no further operation. For example, the device management server 102 does not indicate the IoT device 101 to send the device identifier or the first SIM card identifier. When the IoT device 101 sends the device identifier of the IoT device 101 and the corresponding first SIM card identifier again (in this case, the IoT device 101 periodically sends the data report message to the device management server 102), if the device management server 102 determines that the device-card binding status of the IoT device 101 is that device-card binding has not been set, the device management server 102 updates the second SIM card identifier to the first SIM card identifier. For details, refer to steps 203 and 204 in the embodiment shown in FIG. 2.

It should be understood that when the device-card binding status of the IoT device is stored in another server, an action that the device management server 102 updates the device-card binding status in step 311 may not be performed.

312: The device management server 102 sends a data synchronization message to the connectivity management server 103, where the data synchronization message carries the device identifier of the IoT device 101 and the corresponding first SIM card identifier.

For specific content, refer to step 205 in the embodiment shown in FIG. 2. Details are not described herein again.

It should be understood that the data synchronization message may further carry an indication for resuming the SIM card corresponding to the first SIM card identifier, especially when the second message in step 307*a* carries the indication for disabling the SIM card corresponding to the first SIM card identifier.

When device-card unbinding has been performed on the IoT device 101, replacing the SIM card is a normal operation, and has no security risk. In this case, the connectivity management server 103 should resume the related SIM card, to avoid normal operating of the IoT device. Resuming the SIM card corresponding to the first SIM card identifier means that a connection to a communications network is provided for the SIM card corresponding to the first SIM card identifier. A case for resuming the second SIM card identifier is similar, and details are not described again. However, because the SIM card corresponding to the second SIM card identifier is no longer used in the IoT device 101, whether to resume the SIM card may be determined according to a policy.

313: The connectivity management server 103 updates the second SIM card identifier to the first SIM card identifier.

After receiving the data synchronization message, the connectivity management server 103 updates the second SIM card identifier to the first SIM card identifier.

Further, the connectivity management server 103 resumes, based on the data synchronization message, the SIM card corresponding to the first SIM card identifier. The connectivity management server 103 may determine, based on the device identifier of the IoT device 101 and the first SIM card identifier that are carried in the data synchronization message, to resume the SIM card corresponding to the first SIM card identifier. Alternatively, the connectivity management server 103 may resume the SIM card based on an indication that is carried in the data synchronization message and that is used for resuming the SIM card corresponding to the first SIM card identifier.

Specifically, the connectivity management server 103 may send, to an operator-side server, a notification message for resuming the SIM card corresponding to the first SIM card identifier. The operator-side server herein may be specifically a BOSS, an HSS, a UDM device, or the like.

Alternatively, for an eSIM card or a SOC SIM card, the connectivity management server 103 may remotely write related data (such as a SIM card identifier and user identity data) again, so that the SIM card corresponding to the first SIM card identifier can continue to be connected to the communications network.

Optionally, the connectivity management server 103 may further send a fourth message to the client device 104, where the fourth message is used to notify the client device 104 that the SIM card corresponding to the first SIM card identifier has been disabled. After receiving the notification message, the client device 104 sends a prompt to the user. The client device 104 receives an input used to resume the SIM card corresponding to the first SIM card identifier, and sends a fifth message to the connectivity management server 103, where the fifth message is used to notify the connectivity management server 103 to resume the SIM card corresponding to the first SIM card identifier. The connectivity management server 103 resumes the SIM card based on the fifth message. The fourth message may be an HTTPS message or an HTTP message, and/or the fifth message may also be an HTTPS message or an HTTP message.

For the SIM card corresponding to the second SIM card identifier, the method is similar, and details are not described again.

Sequence numbers of the steps may not represent an execution sequence. For example, step 307*a* may be performed during performing steps 305 to 307. In addition, each step is not necessarily performed. For example, if the user does not choose to perform device-card unbinding on the IoT device 101, steps 309 to 313 are not performed. In addition, some steps may be repeatedly performed. For example, if the SIM card in the IoT device 101 is replaced again, steps 302 to 313 are repeatedly performed.

In the IoT device data management method provided, after obtaining the device identifier and the first SIM card identifier, the IoT device 101 reports the device identifier and the first SIM card identifier to the device management server 102. The device management server 102 determines that the device management server 102 has stored the second SIM card identifier corresponding to the device identifier, and further determines the device-card binding status of the IoT device 101. If device-card binding has been set for the IoT device 101, the device management server 102 does not update the second SIM card identifier temporarily, but set the IoT device 101 to the abnormal status, and notify the connectivity management server 103 to disable the second SIM card corresponding to the second SIM card identifier. When device-card binding has been set, there is a security risk if the SIM card is updated. The method provided can avoid such a security risk, and improve security.

Further, the client device 104 provides the user with a management service of setting device-card binding and device-card unbinding, to improve management efficiency and ensure user experience.

Further, the device management server 102 may further update the second SIM card identifier after device-card unbinding is performed, to update the correspondence between the device identifier of the IoT device 101 and the SIM card identifier; and synchronize the device identifier and the first SIM card identifier to the connectivity management server 103, so that the connectivity management server 103 also updates the correspondence. This facilitates cooperative use of the device management server 102 and the connectivity management server 103. For details, refer to the descriptions in the embodiment shown in FIG. 2. Details are not described herein again.

Description is provided by still using an example in which a power grid company A enables a smart meter reading service. A plurality of meters in a jurisdiction area of the power grid company A are a plurality of IoT devices 101. For specific content, refer to the descriptions in the example of the power grid company A in the embodiment shown in FIG. 2. In step 301, house of a user B in the jurisdiction area of the power grid company A is sold to a user C. To ensure security of information such as user data, the power grid company A needs to replace a SIM card in a meter A504 in the house of the original user B. An administrator of the power grid company A may provide a door-to-door service to replace the SIM card, for example, release the original SIM card whose SIM card identifier is 1234567804 and insert a new SIM card whose SIM card identifier is 1234567806. Alternatively, the administrator of the power grid company A may remotely update information in the SIM card, for example, update information such as a SIM card identifier and user identity data of an eSIM card or an SOC SIM card, and update the SIM card identifier to 1234567806. After the SIM card is replaced, the meter A504 re-accesses a communications network, and re-establishes a connection to the device management server 102.

In step 302, the meter A504 may obtain a device identifier of the meter A504 and a first SIM card identifier. In this case, the device identifier obtained by the meter A505 is A504, and the first SIM card identifier is 1234567806.

In step 303, the meter A504 sends a data report message to the device management server 102, where the data report message carries the device identifier of the meter A504 and the first SIM card identifier, for example, includes a field "A504-1234567806". The device management server 102 receives the data report message, and determines, based on the data report message, that the device identifier of the meter A504 is A504 and the first SIM card identifier is 1234567806. The data report message may further carry an indication of SIM card replacement reporting.

In step 304, the device management server 102 may store and maintain device identifiers of a plurality of meters, corresponding SIM card identifiers, and device-card binding statuses, as shown in Table 3.

TABLE 3

Device identifiers of N + 1 meters, SIM card identifiers, and device-card binding statuses

| Device identifier | SIM card identifier | Device-card binding status |
|---|---|---|
| ... | ... | ... |
| A500 | 1234567800 | Device-card binding has been set |
| A501 | 1234567801 | Device-card binding has been set |
| A502 | 1234567802 | Device-card binding has not been set |
| A503 | 1234567803 | Device-card binding has not been set |
| A504 | 1234567804 | Device-card binding has been set |
| A505 | 1234567805 | Device-card binding has been set |

The device management server 102 receives the data report message sent by the meter A504, and further determines, based on the data report message, that a corresponding second SIM card identifier, namely, 1234567804 has been stored. For example, the device management server 102 queries a device identifier in Table 3 based on the device identifier A504 of the meter, and determines the corresponding SIM card identifier. The device identifier of the meter A504 and the second SIM card identifier have been stored in Table 3. If the second SIM card identifier is different from the first SIM card identifier reported at a current time, the device management server 102 determines that current reporting is SIM card replacement reporting of the meter A504. Alternatively, the device management server 102 determines, based on an indication of the SIM card replacement reporting carried in the data report message, that the current reporting is the SIM card replacement reporting of the meter A504.

The device server 102 may further determine that a device-card binding status of the meter A504 is that device-card binding has been set, and the device management server 102 cannot update the second SIM card identifier to the first SIM card identifier temporarily. If the SIM card is replaced when the device-card binding status is that device-card binding has been set, there are a plurality of possibilities: The administrator of the power grid company A does not unbind the SIM card before replacing the SIM card, or another person maliciously replaces the SIM card to steal the user data. Therefore, there is a security risk in this case. The device server 102 may set a status of the meter A504 to an abnormal status, and then no longer perform an operation on the meter A504, or no longer perform an operation with high security sensitivity on the meter A504.

In step 305, the device management server 102 sends a first message to the client device 104, where the first message is used to notify the client device 104 that device-card binding has been set for the meter A504. The client device 104 is a terminal device that provides running of a client. A user may access an IoT management platform such as the device management server 102 and the connectivity management server 103 by using the client, to manage the meter. It should be understood that the user herein may be the administrator of the power grid company A, and the administrator of the power grid company A may manage the plurality of meters in the jurisdictional area; or the user herein may be a user of the meter, for example, the user C, and the user of the meter may manage a plurality of meters under an account of the user.

In step 306, the client device 104 displays, to the user based on the first message, a prompt that device-card binding has been set for the meter A504.

In step 307, the device management server 102 or the client device 104 sends a second message to the connectivity management server 103, where the second message is used to notify the connectivity management server 103 to disable a SIM card corresponding to the first SIM card identifier and/or a SIM card corresponding to the second SIM card identifier.

In step 308, the connectivity management server 103 disables, based on the second message, the SIM card corresponding to the first SIM card identifier and/or the SIM card corresponding to the second SIM card identifier.

In step 309, the client device 104 receives an input for performing device-card unbinding on the meter A504.

In step 310, the client device 104 sends a third message to the device management server 102, where the third message is used to notify the device management server 102 that device-card unbinding is performed on the meter A504.

In step 311, after receiving the third message, the device management server 102 updates the device-card binding status of the meter A504 to a state that device-card binding has not been set. If the device management server 102 caches the device identifier of the meter A504 and the corresponding first SIM card identifier in step 304, the device management server 102 further updates the second SIM card identifier to the first SIM card identifier. Updated device identifiers of the plurality of meters, corresponding SIM card identifiers, and device-card binding statuses are shown in Table 4.

TABLE 4

Updated device identifiers of N + 1 meters,
SIM card identifiers, and device-card binding statuses

| Device identifier | SIM card identifier | Device-card binding status |
|---|---|---|
| ... | ... | ... |
| A500 | 1234567800 | Device-card binding has been set |
| A501 | 1234567801 | Device-card binding has been set |
| A502 | 1234567802 | Device-card binding has not been set |
| A503 | 1234567803 | Device-card binding has not been set |
| A504 | 1234567806 | Device-card binding has not been set |
| A505 | 1234567805 | Device-card binding has been set |

When the device management server 102 does not cache the device identifier of the meter A504 and the corresponding first SIM card identifier in step 304, for details in this case, reference may be made to the descriptions of step 311 in the embodiment shown in FIG. 3A and FIG. 3B. Details are not described herein again.

In step 312, the device management server 102 sends a data synchronization message to the connectivity management server 103, where the data synchronization message carries the device identifier of the meter A504 and the corresponding first SIM card identifier, for example, includes the field "A504-1234567806".

In step 312, the connectivity management server 103 updates the second SIM card identifier to the first SIM card identifier. For details, refer to the descriptions in step 312 in the embodiment shown in FIG. 3A and FIG. 3B. Details are not described herein again.

Figure 4:
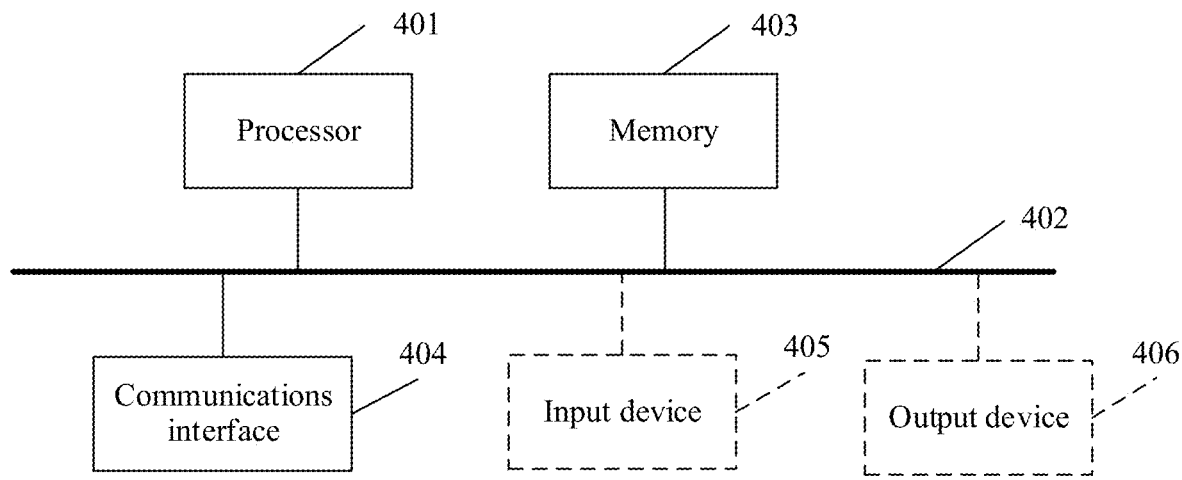
FIG. 4 is a schematic structural diagram of a device management server 102, an IoT device 101, or a connectivity management server 103 according to an embodiment.

The device management server 102, the IoT device 101, or the connectivity management server 103 may be implemented in a manner of a computer device (or a system) in FIG. 4. FIG. 4 is a schematic diagram of a computer device according to an embodiment. The computer device includes at least one processor 401, a communications bus 402, a memory 403, and at least one communications interface 404.

The processor 401 may be a general-purpose central processing unit (CPU), a microprocessor, an application-specific integrated circuit (ASIC), or one or more integrated circuits configured to control program execution of the solutions.

The communications bus 402 may include a path used to transmit information between the foregoing components. The communications interface 404 may be any apparatus of a transceiver type, and is configured to communicate with another device or communications network, such as the Ethernet, a RAN, or a wireless local area network (WLAN).

The memory 403 may be a read-only memory (ROM) or another type of static storage device that can store static information and instructions, or a random-access memory (RAM) or another type of dynamic storage device that can store information and instructions, or may be an electrically erasable programmable ROM (EEPROM), a compact disc ROM (CD-ROM) or another compact disc storage, or an optical disc storage (including a compressed optical disc, a laser disc, an optical disc, a digital versatile disc, a Blu-ray disc, and the like), a magnetic disk storage medium or another magnetic storage device, or any other medium that can be used to carry or store expected program code in a form of an instruction or a data structure and that can be accessed by a computer, but is not limited thereto. The memory may exist independently, and is connected to the processor through the bus. The memory may alternatively be integrated with the processor.

The memory 403 is configured to store application program code for performing the solutions, and the application program code is executed under control of the processor 401. The processor 401 is configured to execute the application program code stored in the memory 403.

In a specific implementation, the processor 401 may include one or more CPUs, and each CPU may be a single-core processor or a multi-core processor. The processor herein may be one or more devices, circuits, and/or processing cores configured to process data (for example, a computer program instruction).

In a specific implementation, in an embodiment, the computer device may further include an input device 405 and an output device 406. For example, the input device 405 may be a mouse, a keyboard, a touchscreen device, or a sensor device. The output device 406 may be a liquid-crystal display (LCD), a light-emitting diode (LED) display device, a cathode-ray tube (CRT) display device, a projector, or the like.

The computer device may be a general-purpose computer device or a dedicated computer device. In a specific implementation, the computer device may be a desktop computer, a portable computer, a network server, a palmtop computer (e.g., personal digital assistant (PDA)), a mobile phone, a tablet computer, a wireless terminal device, a communications device, an embedded device, or a device with a structure similar to that in FIG. 4. A type of the computer device is not limited in this embodiment.

The device management server 102 in FIG. 1 may be the device shown in FIG. 4, and the memory stores one or more software modules. The device management server 102 may implement the software module by using the processor and the program code in the memory, to implement the method performed by the device management server 102 in the foregoing embodiment.

The IoT device 101 in FIG. 1 may be the device shown in FIG. 4, and the memory stores one or more software modules. The IoT device 101 may implement the software module by using the processor and the program code in the memory, to implement the method performed by the IoT device 101 in the foregoing embodiment.

The connectivity management server 103 in FIG. 1 may be the device shown in FIG. 4, and the memory stores one or more software modules. The connectivity management server 103 may implement the software module by using the processor and the program code in the memory, to implement the method performed by the connectivity management server 103 in the foregoing embodiment.

An embodiment further provides a computer-readable storage medium configured to store computer software instructions used by the device (the device management server 102, the IoT device 101, or the connectivity management server 103) shown in FIG. 4. The computer software instructions include programs designed to perform the foregoing method embodiments. The foregoing methods may be implemented by executing the stored programs.

Figure 5:
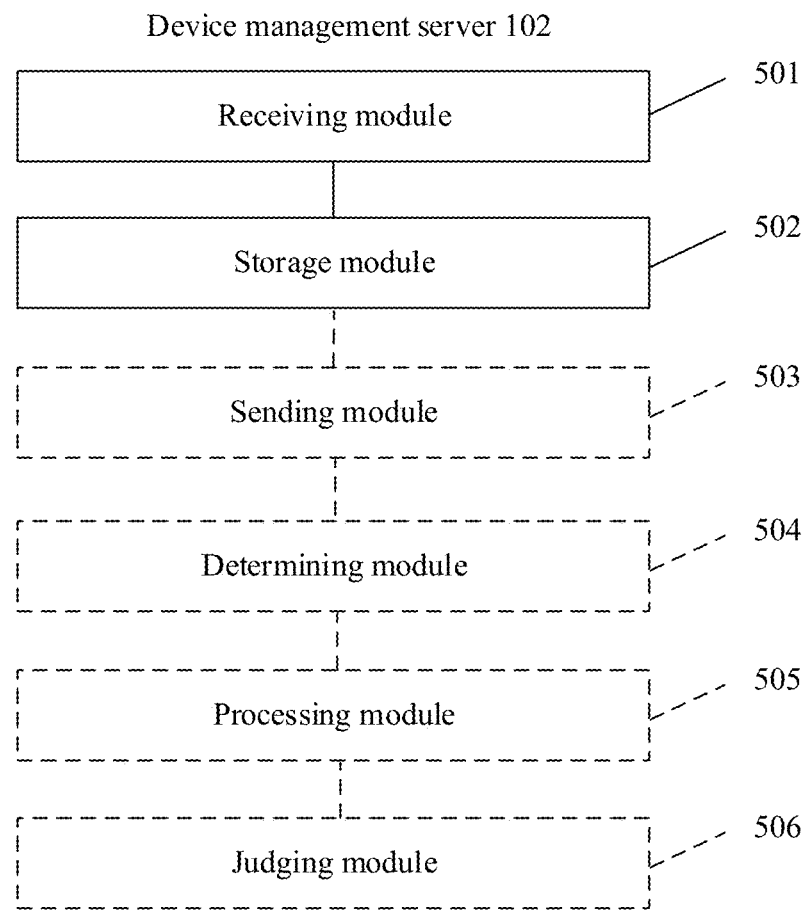
FIG. 5 is a schematic structural diagram of another device management server 102 according to an embodiment.

FIG. 5 is a schematic structural diagram of a device management server 102 according to an embodiment. The device management server 102 includes a receiving module 501 and a storage module 502. The receiving module 501 is configured to receive a data report message sent by an IoT device 101, where the data report message carries a device identifier of the IoT device 101 and a first SIM card identifier, and the first SIM card identifier is an identifier of a SIM card in the IoT device 101. The data report message is an MQTT message or a CoAP message. The storage module 502 is configured to store the device identifier of the IoT device 101 and the corresponding first SIM card identifier. For a specific performing process, refer to the descriptions in the steps in the embodiments shown in FIG. 2 and FIG. 3A and FIG. 3B, for example, steps 203, 204, 303, and 304.

The device management server 102 may further include a sending module 503. The receiving module 501 and/or the sending module 503 are/is configured to establish a connection to the IoT device 101. For example, if an MQTT direct connection is used, if the receiving module 501 of the device management server 102 receives a connection establishment request message, it may indicate that the device management server 102 has established the connection to the IoT device 101. Alternatively, after the receiving module 501 of the device management server 102 receives a connection establishment request message, if the sending module 503 returns a connection success response message, it may indicate that the device management server 102 has established the connection to the IoT device 101. For a specific performing process, refer to the descriptions in the steps in the embodiments shown in FIG. 2 and FIG. 3A and FIG. 3B, for example, steps 201 and 301.

The sending module 503 is further configured to send a data synchronization message to a connectivity management server 103, where the data synchronization message carries the device identifier of the IoT device 101 and the first SIM card identifier. The data synchronization message may also be an MQTT message or a CoAP message. For a specific performing process, refer to the descriptions in the steps in the embodiments shown in FIG. 2 and FIG. 3A and FIG. 3B, for example, steps 205 and 312.

The device management server 102 further includes a judging module 506. The judging module 506 is configured to query a stored device identifier of the IoT device based on the device identifier of the IoT device 101. If a SIM card identifier corresponding to the device identifier of the IoT device 101 has not been stored, the storage module 502 is configured to store the device identifier of the IoT device 101 and the corresponding first SIM card identifier. If a second SIM card identifier corresponding to the device identifier of the IoT device 101 has been stored, the storage module 502 is configured to update the second SIM card identifier to the first SIM card identifier. For a specific performing process, refer to the descriptions in the steps in the embodiments shown in FIG. 2 and FIG. 3A and FIG. 3B, for example, steps 204 and 304.

The device management server 102 further includes a determining module 504. The determining module 504 is configured to: if the second SIM card identifier is different from the first SIM card identifier, determine that device-card binding has been set for the IoT device 101. The sending module 503 is further configured to send a first message to a client device 104, where the first message is used to notify the client device 104 that device-card binding has been set for the IoT device 101.

That the determining module 504 is configured to determine that device-card binding has been set for the IoT device 101 includes: The determining module 504 is configured to determine, based on the device identifier of the IoT device 101 and stored device-card binding statuses of a plurality of IoT devices, that a device-card binding status of the IoT device 101 is that device-card binding has been set. For a specific performing process, refer to the descriptions in the step in the embodiment shown in FIG. 3A and FIG. 3B, for example, step 304.

The device management server 102 may further include a processing module 505. The processing module 505 is configured to set a status of the IoT device 101 to an abnormal status. For a specific performing process, refer to the descriptions in the step in the embodiment shown in FIG. 3A and FIG. 3B, for example, step 304.

The sending module 503 is further configured to send a second message to the connectivity management server 103, where the second message is used to notify the connectivity management server 103 to disable a SIM card related to the IoT device 101, for example, a SIM card corresponding to the first SIM card identifier and/or a SIM card corresponding to the second SIM card identifier. For a specific performing process, refer to the descriptions in the steps in the embodiment shown in FIG. 3A and FIG. 3B, for example, steps 307 and 307a.

The receiving module 501 is further configured to receive a third message sent by the client device 104, where the third message is used to notify the device management server 102 that device-card unbinding is performed on the IoT device 101. For a specific performing process, refer to the descriptions in the step in the embodiment shown in FIG. 3A and FIG. 3B, for example, step 310. The storage module 502 is further configured to update the second SIM card identifier to the first SIM card identifier based on the third message. The storage module 502 may be further configured to update the device-card binding status of the IoT device 101 based on the third message. Specifically, the storage module 502 is configured to update the device-card binding status of the IoT device 101 to a state that device-card binding has not been set. For a specific performing process, refer to the descriptions in the step in the embodiment shown in FIG. 3A and FIG. 3B, for example, step 311.

The functional module may be implemented in a form of hardware, or may be implemented in a form of a software functional module. In a possible embodiment, the device management server 102 shown in FIG. 5 may be in a form shown in FIG. 4. For example, the receiving module 501 and the sending module 503 in FIG. 5 may be implemented by using the communications interface 404 shown in FIG. 4, the storage module 502 in FIG. 5 may be implemented by using the memory 403 shown in FIG. 4, and the determining module 504, the processing module 505, and the judging module 506 in FIG. 5 may be implemented by using the processor 401 shown in FIG. 4.

In a possible embodiment, a functional module of the device management server 102 shown in FIG. 5 may be implemented by using a chip. In this case, the receiving module 501 and the sending module 503 in FIG. 5 may be implemented by using a pin and/or a circuit. The storage module 502 in FIG. 5 may be a storage unit in the chip, such as a register or a buffer, or may be a storage unit located outside the chip. The determining module 504, the processing module 505, and the judging module 506 in FIG. 5 may be implemented by using a processor in the chip.

Figure 6:
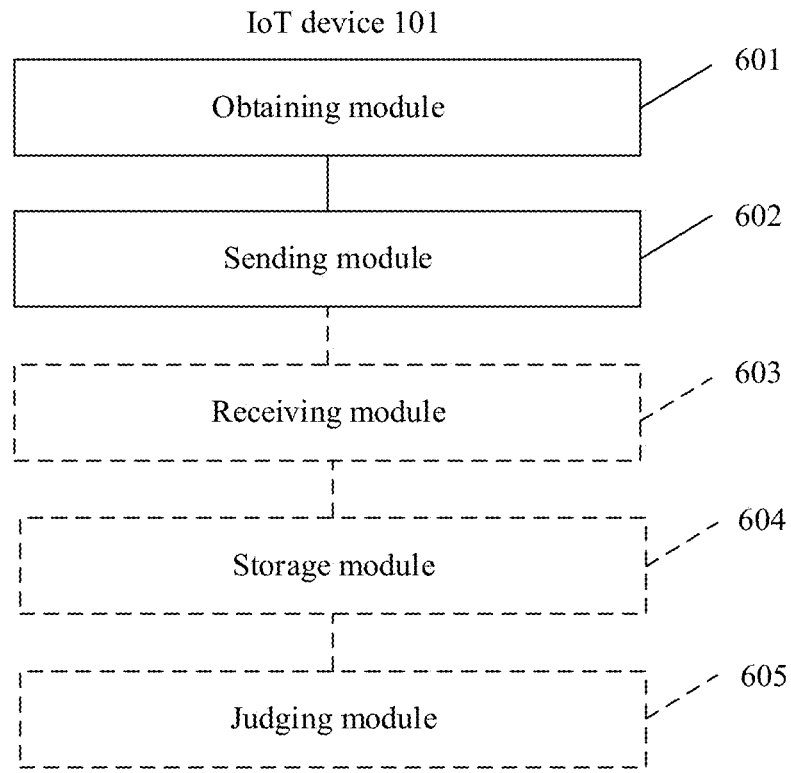
FIG. 6 is a schematic structural diagram of another IoT device 101 according to an embodiment.

FIG. 6 is a schematic structural diagram of an IoT device 101 according to an embodiment. The IoT device 101 includes an obtaining module 601 and a sending module 602. The obtaining module 601 is configured to obtain a device identifier of the IoT device 101 and a first SIM card identifier, where the first SIM card identifier is an identifier of a SIM card in the IoT device 101. For a specific performing process, refer to the descriptions in the steps in the embodiments shown in FIG. 2 and FIG. 3A and FIG. 3B, for example, steps 202 and 302. The sending module 602 is configured to send a data report message to a device management server 102, where the data report message carries the device identifier of the IoT device 101 and the first SIM card identifier. The data report message is an MQTT message or a CoAP message. For a specific performing process, refer to the descriptions in the steps in the embodiments shown in FIG. 2 and FIG. 3A and FIG. 3B, for example, steps 203 and 303.

The IoT device 101 may further include a receiving module 603. The sending module 602 and/or the receiving module 603 are/is configured to establish a connection to the device management server 102. For example, if an MQTT direct connection is used, if the sending module 602 of the IoT device 101 sends a connection establishment request message, it may indicate that the IoT device 101 has established the connection to the device management server 102. Alternatively, after the sending module 602 of the IoT device 101 sends a connection establishment request message, if the receiving module 603 is configured to receive a connection success response message returned by the device management server 102, it may indicate that the IoT device 101 has established the connection to the device management server 102. For a specific performing process, refer to the descriptions in the steps in the embodiments shown in FIG. 2 and FIG. 3A and FIG. 3B, for example, steps 201 and 301.

The IoT device 101 may further include a storage module 604 and a judging module 605. The storage module 605 is configured to store the SIM card identifier obtained by the IoT device 101. If the storage module 604 has stored a second SIM card identifier corresponding to the device identifier, the judging module 605 is configured to compare the second SIM card identifier with the first SIM card identifier. If the second SIM card identifier is different from the first SIM card identifier, the sending module 602 is configured to send the data report message to the device management server 102. The data report message may carry an indication of SIM card replacement reporting. For a specific performing process, refer to the descriptions in the steps in the embodiments shown in FIG. 2 and FIG. 3A and FIG. 3B, for example, steps 202 and 302.

The functional module may be implemented in a form of hardware, or may be implemented in a form of a software functional module. In a possible embodiment, the IoT device 101 shown in FIG. 6 may be in a form shown in FIG. 4. For example, the sending module 602 and the receiving module 603 in FIG. 6 may be implemented by using the communications interface 404 shown in FIG. 4, the storage module 604 in FIG. 6 may be implemented by using the memory 403 shown in FIG. 4, and the obtaining module 601 and the judging module 605 in FIG. 6 may be implemented by using the processor 401 shown in FIG. 4.

In a possible embodiment, a functional module of the IoT device 101 shown in FIG. 6 may be implemented by using a chip. In this case, the sending module 602 and the receiving module 603 in FIG. 6 may be implemented by using a pin and/or a circuit. The storage module 604 in FIG. 6 may be a storage unit in the chip, such as a register or a buffer, or may be a storage unit located outside the chip. The obtaining module 601 and the judging module 605 in FIG. 6 may be implemented by using a processor in the chip.

Figure 7:
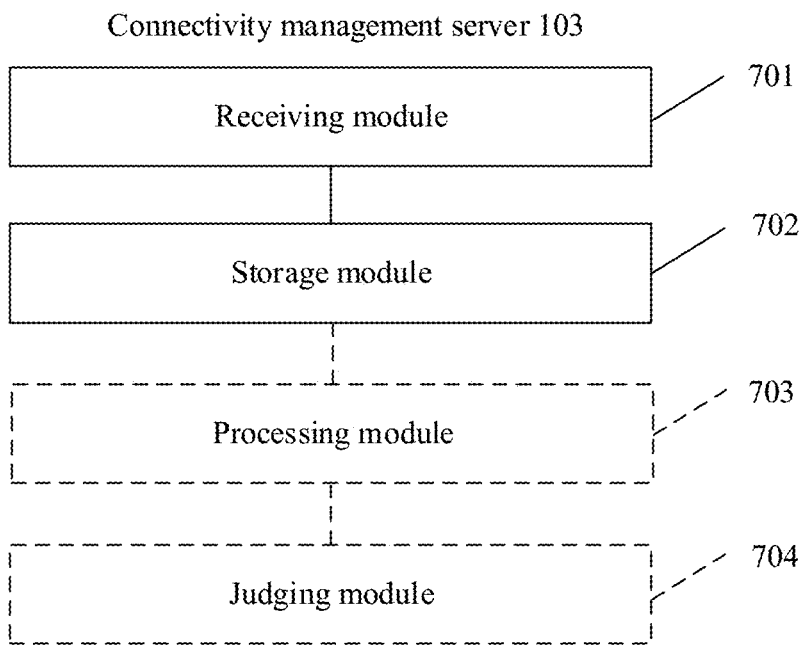
FIG. 7 is a schematic structural diagram of another connectivity management server 103 according to an embodiment.

FIG. 7 is a schematic structural diagram of a connectivity management server 103 according to an embodiment. The connectivity management server 103 includes a receiving module 701 and a storage module 702. The receiving module 701 is configured to receive a data synchronization message sent by a device management server 102, where the data synchronization message carries a device identifier of an IoT device 101 and a first SIM card identifier, and the first SIM card identifier is an identifier of a SIM card in the IoT device 101. The data synchronization message may be an MQTT message or a CoAP message. The storage module 702 is configured to store the device identifier of the IoT device 101 and the corresponding first SIM card identifier. For a specific performing process, refer to the descriptions in the steps in the embodiments shown in FIG. 2 and FIG. 3A and FIG. 3B, for example, steps 205 and 312.

The connectivity management server 103 further includes a processing module 703. The receiving module 701 is further configured to receive a second message sent by the device management server 102 or a client device 104, where the second message is used to notify the connectivity management server 103 to disable a SIM card corresponding to the first SIM card identifier and/or a SIM card corresponding to a second SIM card identifier, and the second SIM card identifier is a SIM card identifier that corresponds to the IoT device and that has been stored in the connectivity management server 103. The processing module 703 is further configured to disable, based on the second message, the SIM card corresponding to the first SIM card identifier and/or the SIM card corresponding to the second SIM card identifier. For a specific performing process, refer to the descriptions in the steps in the embodiment shown in FIG. 3A and FIG. 3B, for example, steps 307a, 307b, and 312.

The connectivity management server 103 further includes a judging module 704. The judging module 704 is configured to query a stored device identifier of the IoT device based on the device identifier of the IoT device 101. If a SIM card identifier corresponding to the device identifier of the IoT device 101 has not been stored, the storage module 702 is configured to store the device identifier of the IoT device 101 and the corresponding first SIM card identifier. If the second SIM card identifier corresponding to the device identifier of the IoT device 101 has been stored, the storage module 702 is configured to update the second SIM card identifier to the first SIM card identifier. The processing module 703 may be further configured to resume, based on the data synchronization message, the SIM card corresponding to the first SIM card identifier. For a specific performing process, refer to the descriptions in the step in the embodiment shown in FIG. 3A and FIG. 3B, for example, step 313.

The functional module may be implemented in a form of hardware, or may be implemented in a form of a software functional module. In a possible embodiment, the connectivity management server 103 shown in FIG. 7 may be in a form shown in FIG. 4. For example, the receiving module 701 in FIG. 7 may be implemented by using the communications interface 404 shown in FIG. 4, the storage module 702 in FIG. 7 may be implemented by using the memory 403 shown in FIG. 4, and the processing module 703 and the judging module 704 in FIG. 7 may be implemented by using the processor 401 shown in FIG. 4.

In a possible embodiment, a functional module of the connectivity management server 103 shown in FIG. 7 may be implemented by using a chip. In this case, the receiving module 701 in FIG. 7 may be implemented by using a pin and/or a circuit. The storage module 702 in FIG. 7 may be a storage unit in a chip, such as a register or a buffer, or may be a storage unit located outside the chip. The processing module 703 and the judging module 704 in FIG. 7 may be implemented by using a processor in the chip.

Numerals used in the embodiments are merely used for differentiation for ease of description, but do not limit the scope of the embodiments. The sequence numbers of the foregoing processes do not mean an execution sequence. The execution sequence of the processes should be determined according to functions and internal logic of the processes, and should not be construed as any limitation on the implementation processes of the embodiments.

A person of ordinary skill in the art may be aware that, various illustrative logical blocks and steps that are described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this disclosure.

In the several embodiments provided, it should be understood that the disclosed system, apparatus, and method may be implemented in other manners. For example, the described apparatus embodiment is merely an example. For example, division into the modules is merely logical function division and may be other division in an actual implementation. For example, a plurality of modules or components may be combined or integrated into another system, or some features may be ignored or not performed. In addition, the displayed or discussed mutual couplings or direct couplings or communication connections may be implemented through some interfaces. The indirect couplings or communication connections between the apparatuses or modules may be implemented in electronic, mechanical, or other forms.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedure or functions according to the embodiments are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state drive (SSD)), or the like.

The foregoing descriptions are merely specific implementations, but are not intended to limit the protection scope of this disclosure. Any variation or replacement readily figured out by a person skilled in the art within the technical scope disclosed shall fall within the protection scope of this disclosure. Therefore, the protection scope of this disclosure shall be subject to the protection scope of the claims.

What is claimed is:

1. A method implemented by a device management server and comprising:
   receiving, from an internet of things (IoT) device, a data report message comprising a device identifier of the IoT device and a first subscriber identity module (SIM) card identifier, wherein the first SIM card identifier is of a SIM card in the IoT device;
   storing the device identifier, the first SIM card identifier, and a correspondence between the device identifier and the first SIM card identifier;
   identifying that a second SIM card identifier corresponding to the device identifier is stored, wherein the second SIM card identifier is different than the first SIM card identifier, and wherein device-card binding is set for the IoT device; and
   updating the second SIM card identifier to the first SIM card identifier based on the device-card binding being set for the IoT device and after device-card unbinding has been performed on the IoT device.

2. The method of claim 1, further comprising sending, to a connectivity management server, a data synchronization message comprising the device identifier and the first SIM card identifier.

3. The method of claim 1, wherein the data report message is a Message Queuing Telemetry Transport (MQTT) message or a Constrained Application Protocol (CoAP) message.

4. The method of claim 1, wherein the device-card binding is set on a home subscriber server (HSS) or a unified data management (UDM) device.

5. The method of claim 4, further comprising sending, to a client device, a first message notifying the client device that a device-card binding has been set for the IoT device.

6. The method of claim 5, further comprising setting a status of the IoT device to an abnormal status.

7. The method of claim 6, further comprising sending, to a connectivity management server, a second message notifying the connectivity management server to disable the SIM card.

8. The method of claim 5, further comprising receiving, from the client device, a third message notifying the device management server that device-card unbinding is to be performed on the IoT device.

9. The method of claim 8, further comprising updating the second SIM card identifier to the first SIM card identifier based on the third message.

10. The method of claim 9, further comprising updating the device-card binding of the IoT device based on the third message.

11. A method implemented by an internet of things (IoT) device and comprising:
    obtaining a device identifier of an IoT device and a first subscriber identity module (SIM) card identifier, wherein the first SIM card identifier is of a SIM card in the IoT device;
    sending, to a device management server, a data report message comprising the device identifier and the first SIM card identifier;
    receiving, from the device management server, a message notifying a client device that device-card binding has been set for the IoT device, wherein the device-card binding being set indicates that the device management server wait until a user performs device-card unbinding is performed on the IoT device before a second SIM card identifier on the device management server is updated to the first SIM card identifier on the device management server and based on the device-card binding; and displaying a prompt that the device-card binding has been set for the IoT device.

12. The method of claim 11, wherein the data report message is a Constrained Application Protocol (CoAP) message.

13. The method of claim 11, further comprising establishing, before sending the data report message, a connection with the device management server to form a data report channel.

14. The method of claim 11, wherein the data report message further comprises an indication of SIM card replacement reporting.

15. A method implemented by a connectivity management server and comprising:
  receiving, from a device management server, a data synchronization message comprising a device identifier of an internet of things (IoT) device and a first subscriber identity module (SIM) card identifier, wherein the first SIM card identifier is of a SIM card in the IoT device;
  storing the device identifier, the first SIM card identifier, and a correspondence between the device identifier and the first SIM card identifier, wherein a second SIM card identifier corresponding to the device identifier is stored on the device management server, and wherein the second SIM card identifier is different than the first SIM card identifier; and
  receiving, from the device management server, a first message that the second SIM card identifier is updated to the first SIM card identifier based on device-card binding being set for the IoT device and after device-card unbinding has been performed on the IoT device.

16. The method of claim 15, wherein the data synchronization message is a Message Queuing Telemetry Transport (MQTT) message or a Constrained Application Protocol (CoAP) message.

17. The method of claim 15, wherein the second SIM card identifier is different than the first SIM card identifier.

18. The method of claim 15, further comprising resuming, based on the data synchronization message, using the SIM card corresponding to the first SIM card identifier.

19. The method of claim 15, further comprising receiving, from the device management server, a second message notifying a connectivity management server to disable the SIM card.

20. The method of claim 15, wherein the device-card binding is set on a home subscriber server (HSS) or a unified data management (UDM) device.

* * * * *

UNITED STATES PATENT AND TRADEMARK OFFICE
CERTIFICATE OF CORRECTION

PATENT NO. : 12,301,664 B2  
APPLICATION NO. : 17/682164  
DATED : May 13, 2025  
INVENTOR(S) : Tongfei Zhang Page 1 of 1

It is certified that error appears in the above-identified patent and that said Letters Patent is hereby corrected as shown below:

On the Title Page

Page 2, Column 2, Line 12, FOREIGN PATENT DOCUMENTS: "IN 109030745 A 12/2018" should read "CN 109030745 A 12/2018"

In the Claims

Claim 11, Column 36, Line 65: "server wait until a user performs device-card unbinding" should read "server wait until device-card unbinding"

Signed and Sealed this  
First Day of July, 2025

Coke Morgan Stewart  
*Acting Director of the United States Patent and Trademark Office*